(12) United States Patent
Ares

(10) Patent No.: US 10,311,360 B1
(45) Date of Patent: Jun. 4, 2019

(54) SYSTEM AND METHOD FOR BUILDING AND USING ROBOTIC MANAGERS

(71) Applicant: Jean-Michel Raymond Ares, Milton, GA (US)

(72) Inventor: Jean-Michel Raymond Ares, Milton, GA (US)

(*) Notice: Subject to any disclaimer, the term of this patent is extended or adjusted under 35 U.S.C. 154(b) by 0 days.

(21) Appl. No.: 15/925,995

(22) Filed: Mar. 20, 2018

Related U.S. Application Data

(60) Provisional application No. 62/474,168, filed on Mar. 21, 2017.

(51) Int. Cl.
*G06F 17/30* (2006.01)
*G06N 5/02* (2006.01)
*G06N 20/00* (2019.01)
*G06F 16/2455* (2019.01)

(52) U.S. Cl.
CPC ....... *G06N 5/022* (2013.01); *G06F 16/24553* (2019.01); *G06N 20/00* (2019.01)

(58) Field of Classification Search
CPC .......... G05B 2219/40393; G05B 2219/36243; G05B 2219/35083; G05B 2219/35086; G06F 17/302; G06F 17/2785; G06N 5/022
See application file for complete search history.

(56) References Cited

U.S. PATENT DOCUMENTS

| | | | |
|---|---|---|---|
| 6,292,715 B1 * | 9/2001 | Rongo | B25J 9/1664 318/568.1 |
| 9,436,760 B1 * | 9/2016 | Tacchi | G06F 17/30684 |
| 9,558,265 B1 * | 1/2017 | Tacchi | G06F 17/30696 |

* cited by examiner

*Primary Examiner* — Yuk Ting Choi
(74) *Attorney, Agent, or Firm* — Eric L. Sophir; Dentons US LLP

(57) ABSTRACT

In one embodiment, the present invention may be implemented as a software platform, data model and method to build robotic managers (RM). A robotic manager is, in one embodiment, a computer system that automates tasks performed by a human manager. A MAP RM has a skillset which may be divided into two categories: 1) basic skills such as visual recognition, voice command processing, data visualization, unstructured search, and 2) expert skills such as finance, risk management, cyber security, and information technology. Expert skills may be categorized by domain.

7 Claims, 43 Drawing Sheets

| MAP domains – banking / enterprise example | | |
|---|---|---|
| Bank objectives | Capabilities | Environment |
| Objectives | Bank capabilities | Economy |
| Bank performance | Customer journeys | Industry |
| Financials | Business processes | Competitors |
| Customers | Controls | Time |
| Sales | People | Locations |
| Brand | Suppliers | Teams |
| Mergers & acquisitions | Facilities | Retail |
| Innovation | Products | Commercial |
| Operational excellence | Information technology | Wholesale |
| Initiatives | Data & analytics | Corporate |
| Risk management | Physical assets | T&O |
| Cyber security | | |
| Fraud management | | |
| Issues | | |
| Audit | | |
| Regulatory compliance | | |
| Anti-money laundering | | |

MAP expert skills – banking / enterprise example

| 1. Integration | 2. Objectives | 3. Financials | 4. Customers | 5. Sales |
|---|---|---|---|---|
| 6. Brand | 7. M&A | 8. Innovation | 9. Operational excellence | 10. Initiatives |
| 11. Risk management | 12. Cyber security | 13. Fraud management | 14. Issues | 15. Audit |
| 16. Regulatory compliance | 17. Anti-money laundering | 18. Bank capabilities | 19. Customer journeys | 20. Business processes |
| 21. Controls | 22. People | 23. Suppliers | 24. Facilities | 25. Products |
| 26. Information technology | 27. Data & analytics | 28. Physical assets | 29. Economy | 30. Industry |
| 31. Time | 32. Locations | 33. Total bank | 34. Personal & commercial | 35. Wealth management |
| 36. Capital markets | 37. Corporate | 38. Technology & operations | | |

A) Basic skills

A1) Human ↔ RM interface

1) Interaction
- Understand user commands:
  - visual, voice, sound, unstructured text, widget
- Respond to user commands and communicate with user:
  - voice, sound, unstructured text, widget

2) Visualization
- Determine valid visualization options
- Display data and enable user interaction with widget:
  - table, geo-map, line, bar, waterfall, histogram, pie
  - doughnut, sunburst, bipartite

3) Language
- Understand user commands and respond in different languages
  - voice, unstructured text, widget
- Configure the RM interface in a specific language

4) Teaching
- Enable user to select a topic:
  - ask, browse, search, help, narrative
- Teach users with multi-media:
  - voice, audio, video, documents, spreadsheets, animations

A4) RM configurator

| Domain solution library | | |
|---|---|---|
| 1 | Data grid 1 | Analytics 1 |
| ... | ... | ... |
| N | Data grid N | Analytics n |

| Industry solution library | | |
|---|---|---|
| 1 | Data grid 1 | Analytics 1 |
| ... | ... | ... |
| N | Data grid N | Analytics n |

A5) analytic toolkit
- Real-time graph database and graph analytics
- Engine for large scale in-memory processing
- Structured and unstructured data tagging to a knowledge graph;
- Ability to ingest RDF data sets & access RDF in a callable fashion
- Data science platform
- Machine learning libraries

A2) Applications / data adapters

1) Collaboration / productivity applications
- e-mail, text, social media, spreadsheet, word processing, presentation

2) Enterprise applications
- CRM, ERP, finance, HR, procurement, supply-chain, core banking, PLM, ...

3) Data
- Public data sources: government, universities / academic, standards, ...
- Private data sources: financial markets, search engines, social networks, ...

A3) RM lifecycle management

1) Data management
- Browse, view, select, edit, ingest and analyze data grid:
  - data sources, tables, attributes, relationships, graphs
  - by domain, by table type, by relationship type
- Key data grid metrics:
  - count/view: data sources, records, attribute, relationship
  - data: profiling, quality, lineage, usage

2) Analytics management
- Browse, select, view, edit, ingest, test, run and analyze analytic models:
  - by domain, by model type
- Key analytic model metrics:
  - data scope: domains, tables, attributes, relationships
  - data model output statistics: tables, relationships, alerts
  - data model usage statistics

3) User management
- Browse, add, delete, edit and analyze user accounts and account parameters:
  - by domain, by user type, by access privileges, by user
- Key user account metrics:
  - login history, view / download history

4) Platform configuration management
- interaction, visualization, language, teaching

5) Platform metrics, monitoring & diagnostics
- Data: metrics, keywords, views, dimensions, facts, unstructured, relationships
- Analytics: alerts, diagnostics, table/fact generation; by domain, by analytic model

Figure 9

| Icon | Meaning | Unicode |
|---|---|---|
| ⚐ | Map logo | F124 |
| ⊕ | Go to map | F3C5 |
| ⟲ | Pivot | F01E |
| ▽ | Filter | F0B0 |
| ≡ | List widget | F03A |
| ▦ | News widget | F1EA |
| ⊞ | Table widget | F0CE |
| ◷ | Pie chart | F200 |
| ✸ | Sunburst | F185 |
| ⊪ | Bar chart | F080 |
| ⋁ | Line chart | F201 |
| ⋎ | Tree | F1E0 |
| ⊕ | Geo-map | F0AC |
| ▣ | Diagram / image | F03E |
| ⊛ | Video widget | F144 |
| ⊜ | Diagnostic | F0F0 |
| ⊖ | Alerts | F06A |
| ⇨ | Voice command | F130 |
| ○ | Search | F002 |
| ♢ | map address | F041 |
| ☆ | Favorites | F005 |
| ▦ | Snapshot | F030 |
| ▤ | Summaries | F3A0 |
| ⊙ | Help | F059 |
| ⓘ | Narrative | F27A |
| ⊕ | Print | F02F |
| ⟲ | Logout | F011 |

Font Awesome 5 Pro

Figure 12

Bank > Financials > External

⇨ ♂ ○ ☆ ▦ ▤ ◎ ◉ ⊕ ↺

| Income Statement | Growth | Dividend |
|---|---|---|
| Total Revenue | Diluted EPS Growth | Dividend Declared per Share |
| Net Interest Income | Net Income Growth | Common Dividends |
| Non-Interest Revenue | Revenue Growth | Preferred Dividends |
| Trading Revenue | NIX Growth | Dividend Yield |
| PCL | Operating Leverage | Adjusted Dividend Payout Ratio |
| NIX | Profitability | Rates |
| CCPB | Efficiency Ratio | Prime Rate - Average Canadian |
| Income Before Taxes | Basic Earnings per Share | Prime Rate - Average US |
| Provision for Income Taxes | Diluted Earnings per Share | $CDN / $USD - Average |
| Net Income | Return on Common Equity | Bank |
| Adjusted Net Income | Return on Average Assets | FTE |
| Balance Sheet | Effective Tax Rate | Branches |
| Total Assets | Effective Tax Rate (teb) | ATMs |
| Total Liabilities & Equity | Shares | Credit Rating |
| Average Loans & Acceptances | Total Market Value of Common Shares | DBRS |
| Average Deposits | | Fitch |
| Average Common Shareholder's equity | Number of Common Shares Outstanding - End of Period | Moody's |
| AUA / AUM | Share Price - Close | S&P |
| AUA | Price-to-Earnings Multiple | |
| AUM | Total Shareholder Return - 12 months | |
| | Total Shareholder Return - 3 years | |
| | Book Value per Share | |
| | Market-to-Book Value Ratio | |

Reported financial measures

Figure 14

Bank > Financials > External

| Income Statement | | Growth | | Dividend | |
|---|---|---|---|---|---|
| Total Revenue | 21,087 | Diluted EPS Growth | 7.4% | Dividend Declared per Share | $3.40 |
| Net Interest Income | 9,872 | Net Income Growth | 5.1% | Common Dividends | 2,191 |
| Non-Interest Revenue | 11,215 | Revenue Growth | 6.8% | Preferred Dividends | 150 |
| Trading Revenue | 1,291 | NIX Growth | 6.7% | Dividend Yield | 3.98% |
| PCL | 815 | Operating Leverage | 2.1% | Adjusted Dividend Payout Ratio | 45.0% |
| NIX | 12,997 | Profitability | | Rates | |
| CCPB | 1,543 | Efficiency Ratio | 59.2% | Prime Rate - Average Canadian | 2.70% |
| Income Before Taxes | 5,732 | Basic Earnings per Share | $7.55 | Prime Rate - Average US | 3.50% |
| Provision for Income Taxes | 1,101 | Diluted Earnings per Share | $7.52 | $CDN / $USD - Average | 1.3 |
| Net Income | 4,831 | Return on Common Equity | 13.1% | Bank | |
| Adjusted Net Income | 5,020 | Return on Average Assets | 0.71% | FTE | 45,234 |
| Balance Sheet | | Effective Tax Rate | 19.92% | Branches | 1,522 |
| Total Assets | 687,935 | Effective Tax Rate (teb) | 25.94% | ATMs | 4,599 |
| Total Liabilities & Equity | 687,935 | Shares | | Credit Rating | |
| Average Loans & Acceptances | 357,708 | Total Market Value of Common Shares | 55,122 | DBRS | AA |
| Average Deposits | 468,723 | | | Fitch | AA- |
| Average Common Shareholder's equity | 36,997 | Number of Common Shares Outstanding - End of Period | 646 | Moody's | Aa3 |
| AUA / AUM | | Share Price - Close | $85.36 | S&P | A+ |
| AUA | 654,581 | Price-to-Earnings Multiple | 12 | | |
| AUM | 405,695 | Total Shareholder Return - 12 months | 17.0% | | |
| | | Total Shareholder Return - 3 years | 9.9% | | |
| | | Book Value per Share | $59.56 | | |
| | | Market-to-Book Value Ratio | 1.4 | | |

Reported financial measures ( F17 FY, $ millions )

F16  F17  F18  Q1  Q2  Q3  Q4  YTD  Trend ( Y  Q  M )

Figure 15

Bank > Financials > External

| Income Statement | F16Q4 | F16Q3 | F16Q2 |
|---|---|---|---|
| Total Revenue | 21,087 | 21,087 | 21,087 |
| Net Interest Income | 9,872 | 9,872 | 9,872 |
| Non-Interest Revenue | 11,215 | 11,215 | 11,215 |
| Trading Revenue | 1,291 | 1,291 | 1,291 |
| PCL | 815 | 815 | 815 |
| NIX | 12,997 | 12,997 | 12,997 |
| CCPB | 1,543 | 1,543 | 1,543 |
| Income Before Taxes | 5,732 | 5,732 | 5,732 |
| Provision for Income Taxes | 1,101 | 1,101 | 1,101 |
| Net Income | 4,631 | 4,631 | 4,631 |
| Adjusted Net Income | 5,020 | 5,020 | 5,020 |
| Balance Sheet | | | |
| Total Assets | 687,935 | 687,935 | 687,935 |
| Total Liabilities & Equity | 687,935 | 687,935 | 687,935 |
| Average Loans & Acceptances | 357,708 | 357,708 | 357,708 |
| Average Deposits | 468,723 | 468,723 | 468,723 |
| Average Common Shareholder's equity | 36,997 | 36,997 | 36,997 |
| AUA & AUM | | | |
| AUA | 654,581 | 654,581 | 654,581 |
| AUM | 405,695 | 405,695 | 405,695 |

Reported financial measures ( $ millions )

F16  F17  F18   Q1  Q2  Q3  Q4   YTD   Trend ( Y  Q  M )

Figure 16

| | F16Q4 | F16Q3 | F16Q2 |
|---|---|---|---|
| ⊙ Income Statement | | | |
| Total Revenue | 21,087 | 21,087 | 21,087 |
| Net Interest Income | 9,872 | 9,872 | 9,872 |
| Non-Interest Revenue | 11,215 | 11,215 | 11,215 |
| Trading Revenue | 1,291 | 1,291 | 1,291 |
| PCL | 815 | 815 | 815 |
| NIX | 12,997 | 12,997 | 12,997 |
| CCPB | 1,543 | 1,543 | 1,543 |
| Income Before Taxes | 5,732 | 5,732 | 5,732 |
| Provision for Income Taxes | 1,101 | 1,101 | 1,101 |
| Net Income | 4,631 | 4,631 | 4,631 |
| Adjusted Net Income | 5,020 | 5,020 | 5,020 |
| ⊙ Balance Sheet | | | |
| Total Assets | 687,935 | 687,935 | 687,935 |
| Total Liabilities & Equity | 687,935 | 687,935 | 687,935 |
| Average Loans & Acceptances | 357,708 | 357,708 | 357,708 |
| Average Deposits | 468,723 | 468,723 | 468,723 |
| Average Common Shareholder's equity | 36,997 | 36,997 | 36,997 |
| ⊙ AUA & AUM | | | |
| AUA | 654,581 | 654,581 | 654,581 |
| AUM | 405,695 | 405,695 | 405,695 |

COLUMNS
- Same features as rows

ROWS
- Multiple levels in the OT may be displayed (L1, L2, ... LN)
- Drill down with ⊕ ⊖
- Click on line title to move the view to the next level in the tree hierarchy

Figure 17: Table widget example

Income Statement

| | |
|---|---:|
| Total Revenue | 21,067 |
| Net Interest Income | 8,872 |
| Non-Interest Revenue | 11,215 |
| Trading Revenue | 1,291 |
| PCL | 815 |
| NIX | 12,997 |
| CCPB | 1,543 |
| Income Before Taxes | 5,732 |
| Provision for Income Taxes | 1,101 |
| Net Income | 4,631 |
| Adjusted Net Income | 5,020 |

Balance Sheet

| | |
|---|---:|
| Total Assets | 687,935 |
| Total Liabilities & Equity | 687,935 |
| Average Loans & Acceptances | 357,708 |
| Average Deposits | 468,723 |
| Average Common Shareholder's equity | 36,997 |

AUA / AUM

| | |
|---|---:|
| AUA | 654,581 |
| AUM | 405,695 |

Growth

| | |
|---|---:|
| Diluted EPS Growth | 7.4% |
| Net Income Growth | 5.1% |
| Revenue Growth | 8.8% |
| NIX Growth | 6.7% |
| Operating Leverage | 2.1% |

Profitability

| | |
|---|---:|
| Efficiency Ratio | 58.2% |
| Basic Earnings per Share | $7.55 |
| Diluted Earnings per Share | $7.52 |
| Return on Common Equity | 13.1% |
| Return on Average Assets | 0.71% |
| Effective Tax Rate | 19.92% |
| Effective Tax Rate (teb) | 25.94% |

Shares

| | |
|---|---:|
| Total Market Value of Common Shares | 55,122 |
| Number of Common Shares Outstanding - End of Period | 646 |
| Share Price - Close | $85.36 |
| Price-to-Earnings Multiple | 12 |
| Total Shareholder Return - 12 months | 17.0% |
| Total Shareholder Return - 3 years | 9.9% |
| Book Value per Share | $59.56 |
| Market-to-Book Value Ratio | 1.4 |

Dividend

| | |
|---|---:|
| Dividend Declared per Share | $3.40 |
| Common Dividends | 2,191 |
| Preferred Dividends | 150 |
| Dividend Yield | 3.96% |
| Adjusted Dividend Payout Ratio | 45.0% |

Rates

| | |
|---|---:|
| Prime Rate - Average Canadian | 2.70% |
| Prime Rate - Average US | 3.50% |
| $CDN / $USD - Average | 1.3 |

Bank

| | |
|---|---:|
| FTE | 45,234 |
| Branches | 1,522 |
| ATMs | 4,599 |

Credit Rating

| | |
|---|---:|
| DBRS | AA |
| Fitch | AA- |
| Moody's | Aa3 |
| S&P | A+ |

- Information is presented in columns, optimizing available space on the display.
- Drill down with ⊕ ⊖
- If there is insufficient space to display all information, an arrow is displayed in the upper right / left to enable horizontal scrolling

Figure 18: News widget example

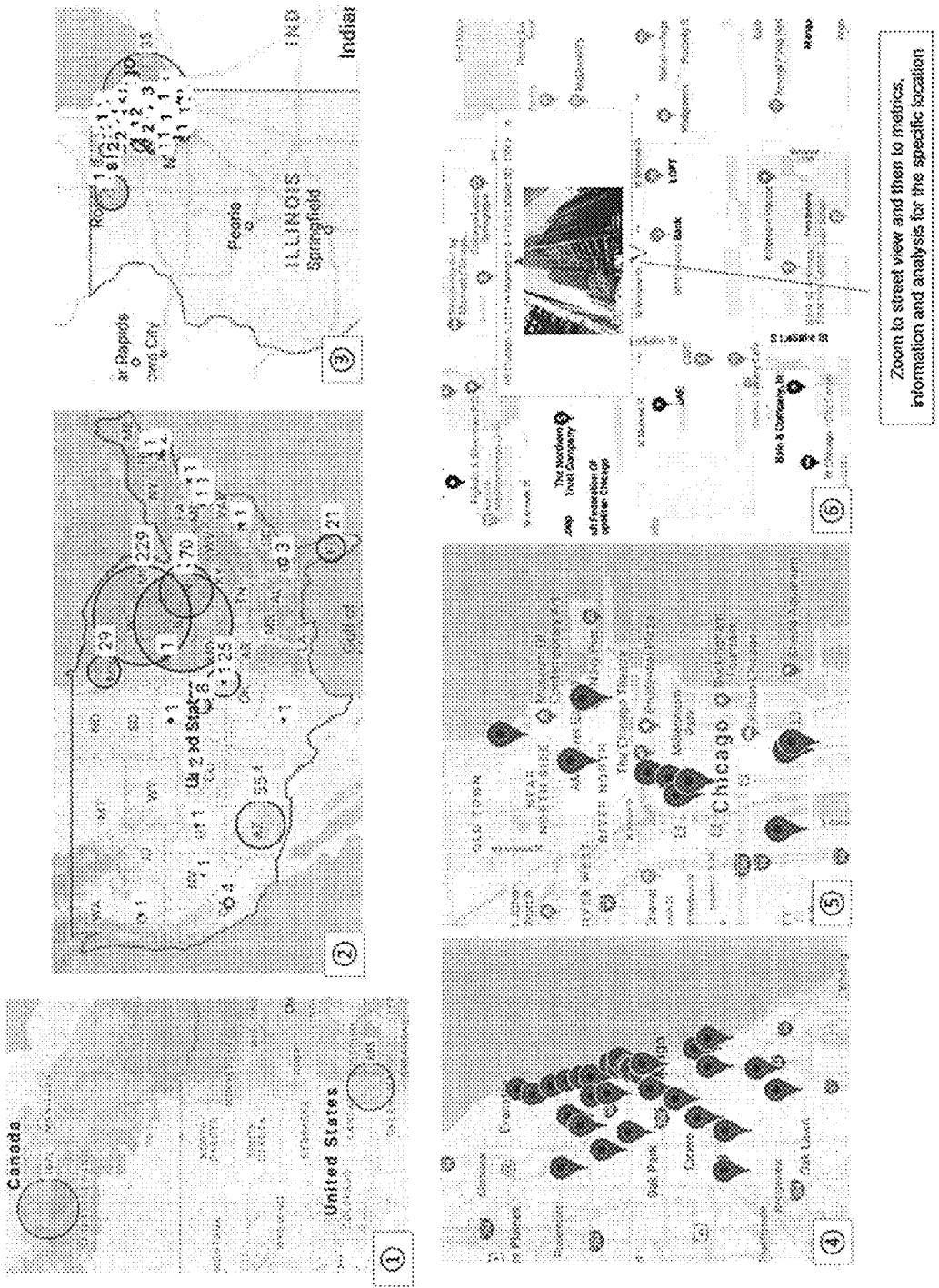
Figure 19: Geo-map widget example

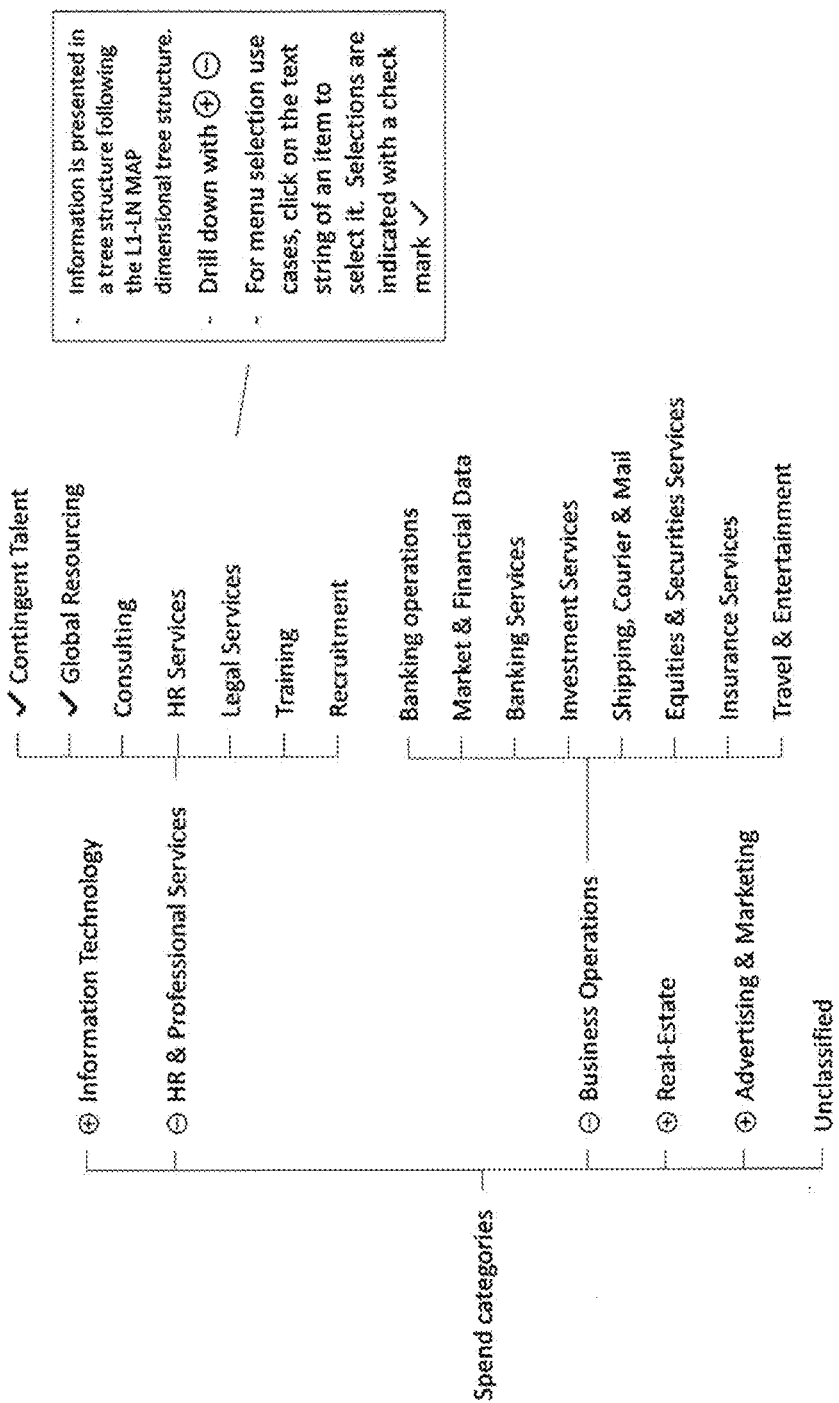
Figure 20: Tree widget example

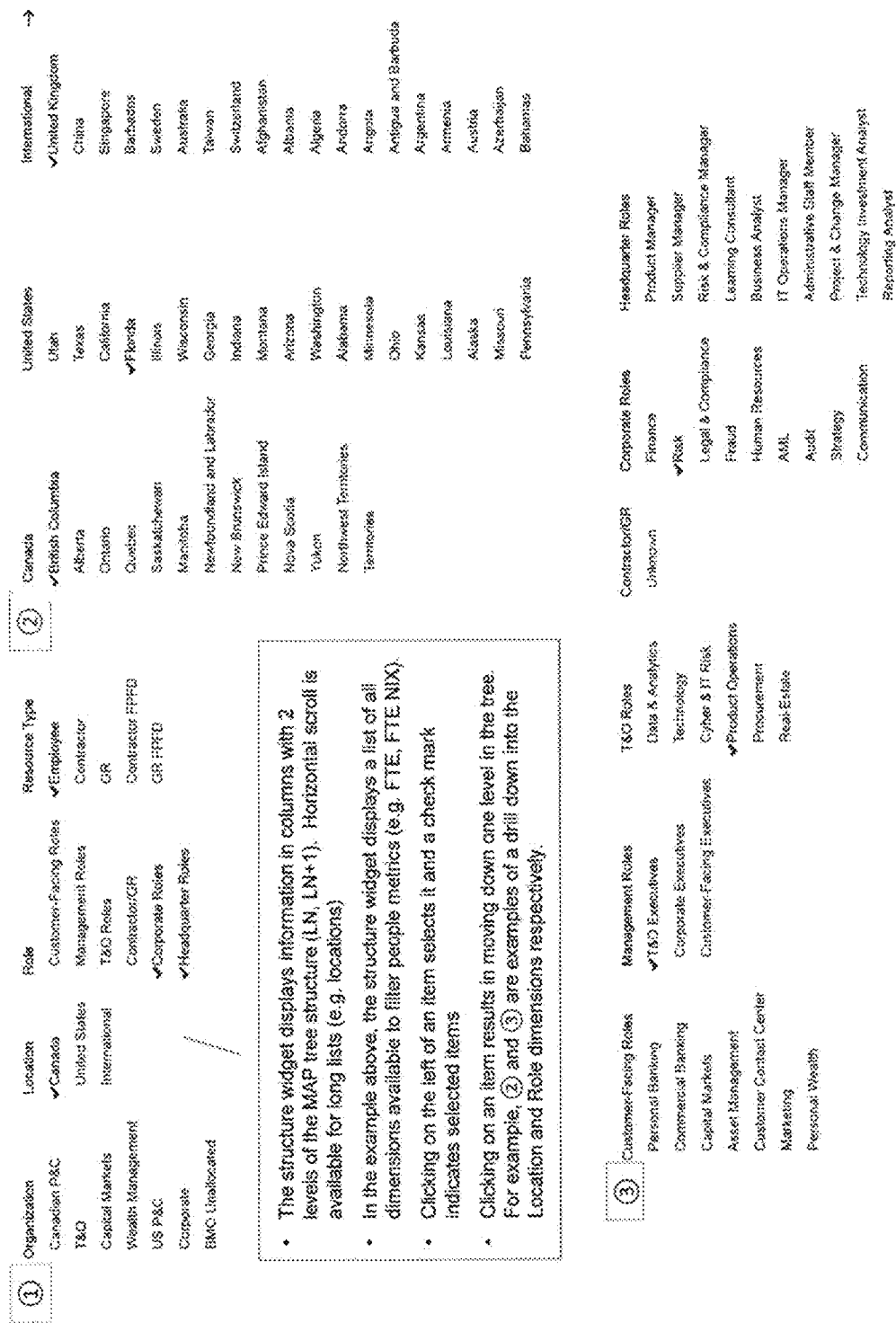
Figure 21: Structure widget example

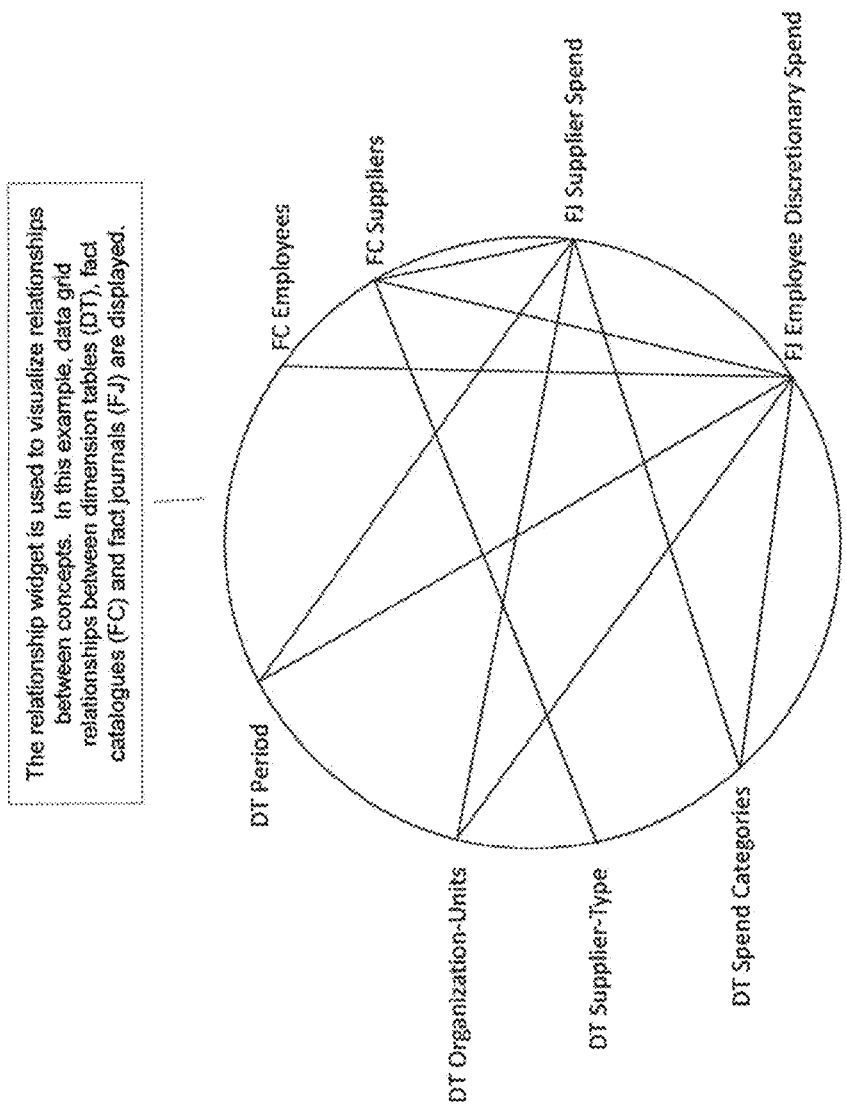
Figure 22: Relationship widget example

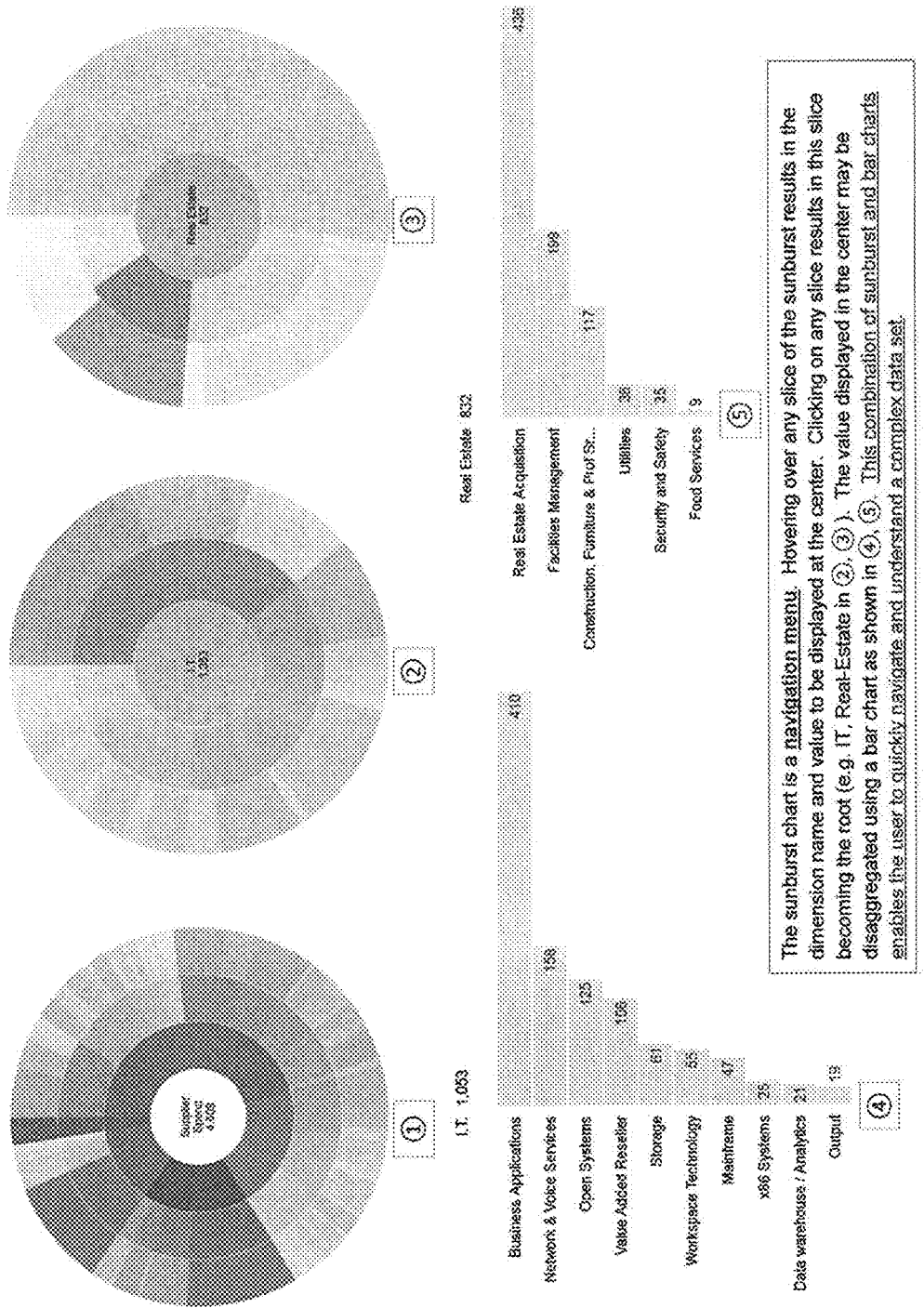
Figure 23: Sunburst widget example

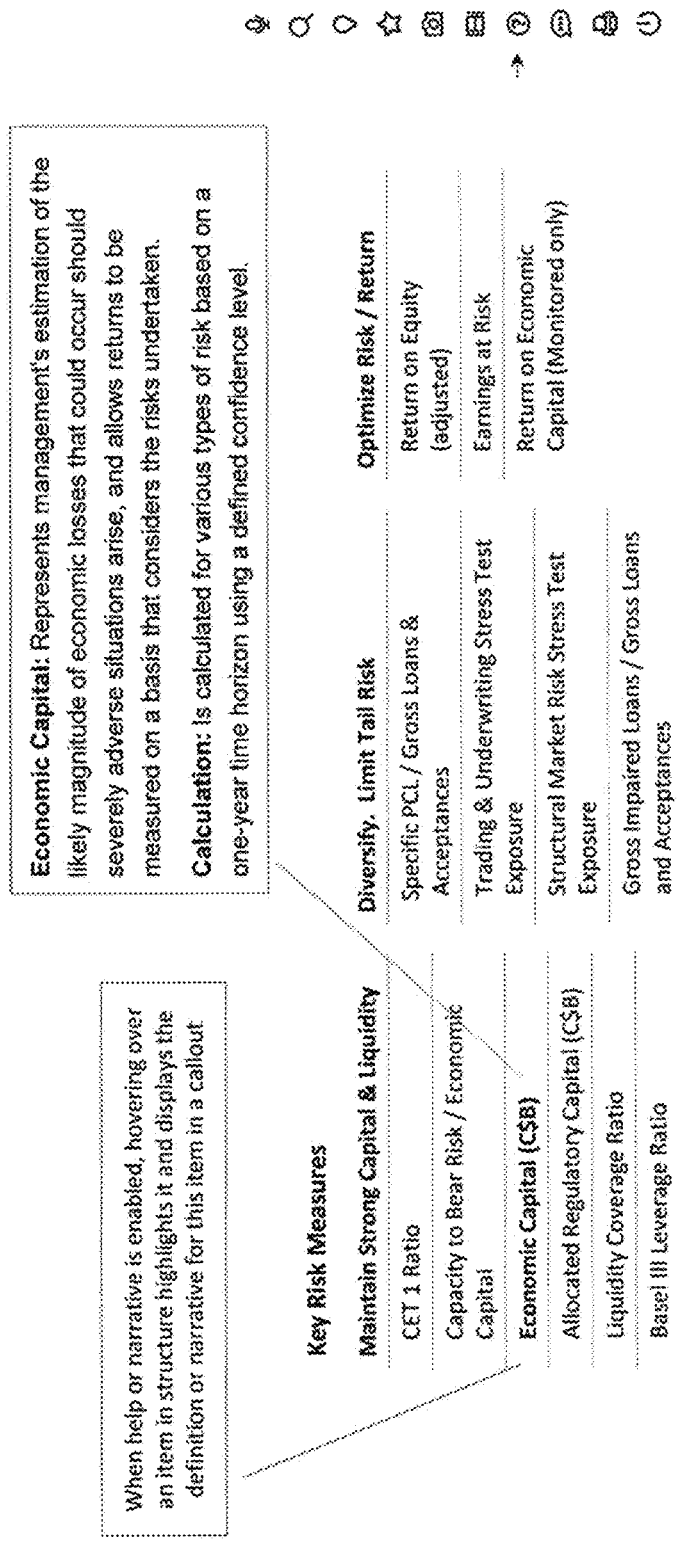
Figure 24: Help / Narrative widget example

The summaries widget contains user created summaries. A summary is created by clicking on < New Summary> and assigning a name to it. From this point, the user may navigate the user interface and add views to the summary simply by clicking on the camera icon 📷

| Summary | Author | Date |
|---|---|---|
| < New Summary> | | |
| Financial results Q1 18 | name | 1/1/18 |
| Spend analytics Q1 18 | name | 2/1/18 |
| Customer loyalty Q4 17 | name | 1/10/18 |
| IT investment plan F18 FY | name | 1/12/18 |
| Issues Q2 18 | name | 2/2/18 |
| Process cost structure Q1 18 | name | 1/8/18 |
| Competitive analysis Q1 18 | name | 3/1/18 |

Play, Edit or Delete a Summary

Figure 25: Summaries widget – catalogue feature

The Summaries widget is assembled with the icons software components described below.

| Feature | Icon | Description |
|---|---|---|
| Frame | | • A Frame is a "View" with specific menu settings.<br>• A Frame captures all menu settings and therefore, the View can be replicated<br>• A Frame can also be replayed with different "Period" settings to see it at other points in time |
| Summary | | A Summary is a sequence of Frames |
| Camera | | The Camera is used to capture Frames |
| Play/Stop | | Click to play. Click again to stop. |
| Step forward | | |
| Step backward | | |
| Edit | | |
| Delete | | |
| Save | | |
| Clip Preview Pane | | Provides a Preview of the selected Clip |
| Clip Viewer | | Playback a Clip |

Figure 26: Summaries widget — components

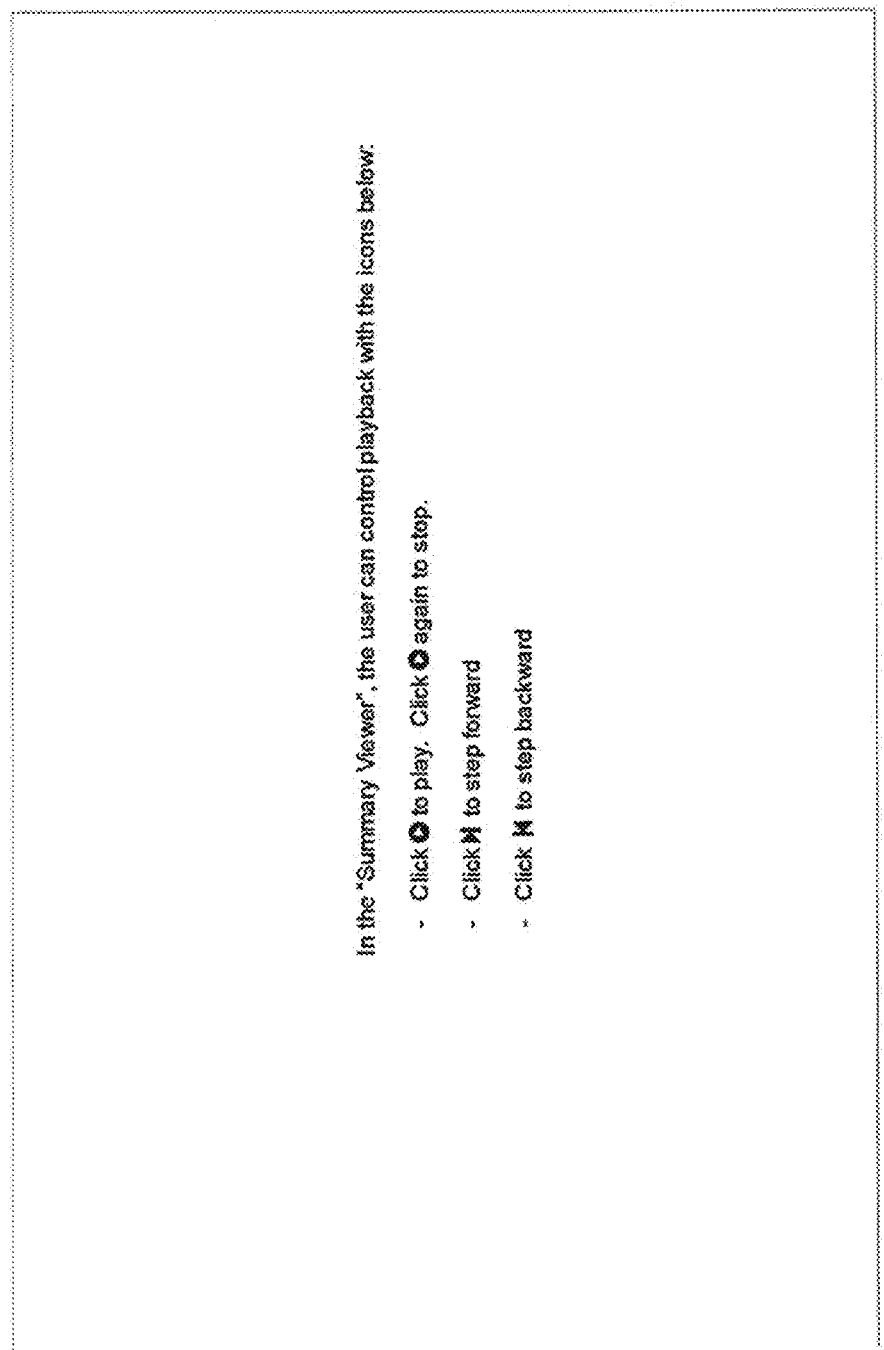
Figure 27: Summaries widget – playback feature

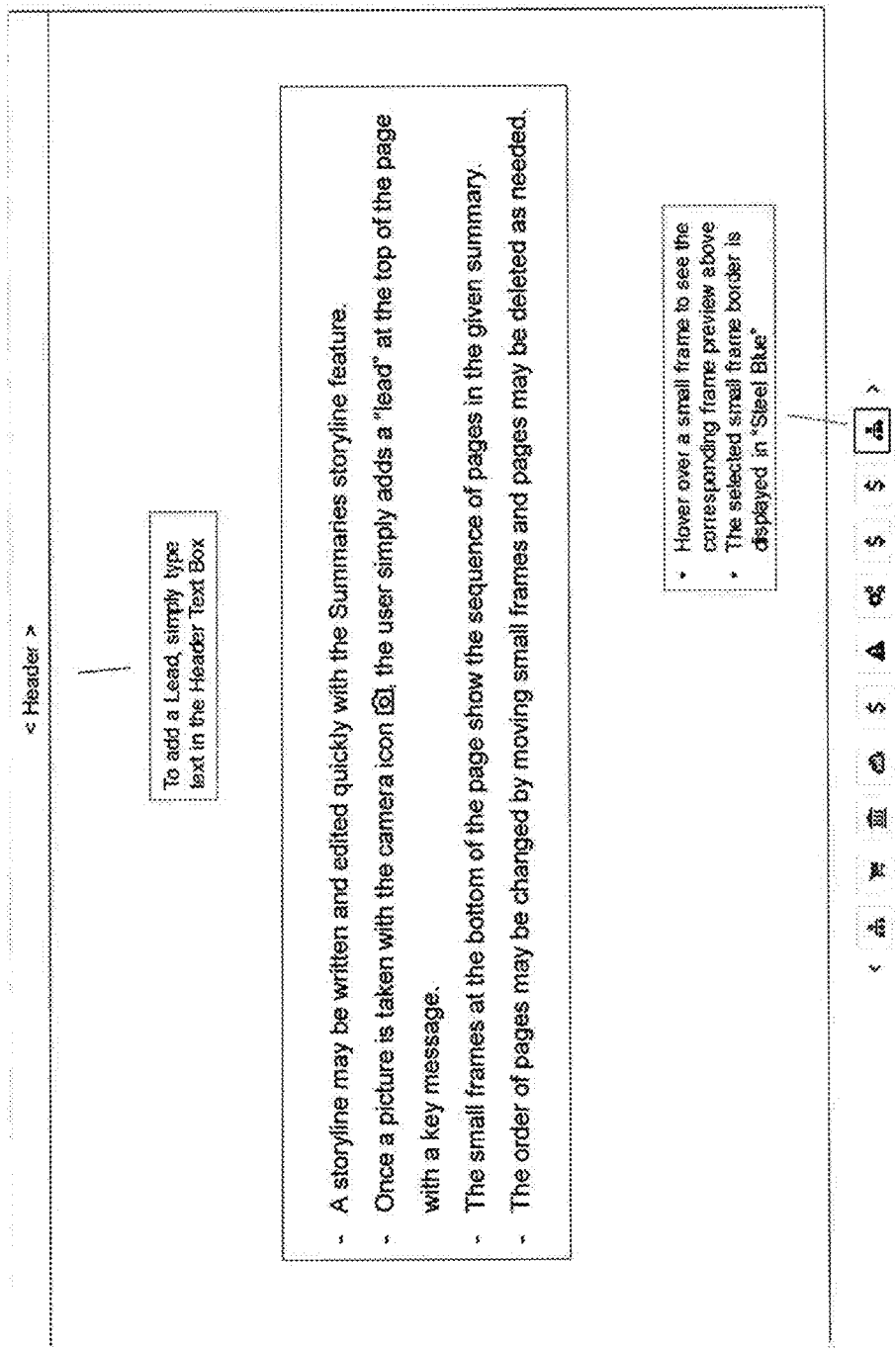
Figure 28: Summaries widget – storyline feature

Adapters – examples

Applications

Collaboration
- E-mail
- Calendar
- Text messaging
- Social networks
- Shared drive
- Document mgmt Enterprise
- Core banking
- CRM
- SRM
- ERP
- Risk, regulatory
- IT

Data

Types
- Structured
- Unstructured
- Streaming

Sources
- Internal
- Government
- Universities
- Amazon
- Google
- Microsoft
- Facebook
- LinkedIn
- Bloomberg
- Reuters
- ...

Figure 29

| 1. Staff teams & prioritize domains | |
|---|---|
| Bank objectives | MAP domains |
| Objectives | Capabilities     Environment |
| Bank performance | Bank capabilities     Economy |
| Financials | Customer journeys     Industry |
| Customers | Business processes     Competitors |
| Sales | Controls     Time |
| Brand | People     Locations |
| Mergers & acquisitions | Suppliers     Teams |
| Innovation | Facilities     Retail |
| Operational excellence | Products     Commercial |
| Initiatives | Information technology     Wholesale |
| Risk management | Data & analytics     Corporate |
| Cyber security | Physical assets     T&O |
| Fraud management | |
| Issues | |
| Audit | |
| Regulatory compliance | |
| Anti-money laundering | |

Figure 31

| Key | L1 | L2 | Path-Ext-Rows |
|---|---|---|---|
| 1 | Bank objectives | Objectives | DTV-Objectives |
| 2 | Bank performance | Financials | DTV-Financials |
| 3 | Bank performance | Customers | DTV-Customers |
| 4 | Bank performance | Sales | DTV-Sales |
| 5 | Bank performance | Brand | DTV-Brand |
| 6 | Bank performance | M&A | DTV-M&A |
| 7 | Bank performance | Innovation | DTV-Innovation |
| 8 | Bank performance | Operational excellence | DTV-Operational excellence |
| 9 | Bank performance | Initiatives | DTV-Initiatives |
| 10 | Bank performance | Risk management | DTV-Risk management |
| 11 | Bank performance | Cyber security | DTV-Cyber security |
| 12 | Bank performance | Fraud management | DTV-Fraud management |
| 13 | Bank performance | Issues | DTV-Issues |
| 14 | Bank performance | Audit | DTV-Audit |
| 15 | Bank performance | Regulatory compliance | DTV-Regulatory compliance |
| 16 | Bank performance | Anti-money laundering | DTV-Anti-money laundering |
| 17 | Capabilities | Bank capabilities | DTV-Bank capabilities |
| 18 | Capabilities | Customer journeys | DTV-Customer journeys |
| 19 | Capabilities | Business processes | DTV-Business processes |
| 20 | Capabilities | Controls | DTV-Controls |
| 21 | Capabilities | People | DTV-People |
| 22 | Capabilities | Suppliers | DTV-Suppliers |
| 23 | Capabilities | Facilities | DTV-Facilities |
| 24 | Capabilities | Products | DTV-Products |
| 25 | Capabilities | Information technology | DTV-Information technology |
| 26 | Capabilities | Data & analytics | DTV-Data & analytics |
| 27 | Environment | Economy | DTV-Economy |
| 28 | Environment | Industry | DTV-Industry |
| 29 | Environment | Competitors | DTV-Competitors |
| 30 | Environment | Time | DTV-Time |
| 31 | Environment | Locations | DTV-Locations |
| 32 | Tools | Learning | DTV-Learning |
| 33 | Tools | Monitoring & diagnostics | DTV-Monitoring & diagnostics |
| 34 | Tools | Data grid & graph | DTV-Data grid & graph |
| 35 | Tools | System administration | DTV-System administration |
| 36 | Teams | Total bank | DTV-Total bank |
| 37 | Teams | Personal & Commercial | DTV-Personal & commercial |
| 38 | Teams | Wealth management | DTV-Wealth management |
| 39 | Teams | Capital markets | DTV-Capital markets |
| 40 | Teams | Corporate | DTV-Corporate |
| 41 | Teams | T&O | DTV-T&O |

Figure 37

| Key | DTM_Domain | Metric_Group | L1 | L2 |
|---|---|---|---|---|
| 1 | 26 \| Information Technology | Asset_Inventory | Application Count | By IT Type |
| 2 | 26 \| Information Technology | Asset_Inventory | Application Count | By IT Type & Accountable CIO |
| 3 | 26 \| Information Technology | Asset_Inventory | Application Count | By IT Type & Organization |
| 4 | 26 \| Information Technology | Asset_Inventory | Application Count | By Criticality |
| 5 | 26 \| Information Technology | Asset_Inventory | Application Count | By Criticality & Accountable CIO |
| 6 | 26 \| Information Technology | Asset_Inventory | Application Count | By Criticality & Business Process |
| 7 | 26 \| Information Technology | Asset_Inventory | Application Count | By Criticality & Product |
| 8 | 26 \| Information Technology | Asset_Inventory | Application Count | By Business Process |
| 9 | 26 \| Information Technology | Asset_Inventory | Application Count | By Product |
| 10 | 26 \| Information Technology | Asset_Inventory | Application Count | By Organization |

| Key | Metric_Unique_String | DT1_Key | Path_Ext_Rows | Path_Ext_Rows_DT_Name | Path_Ext_Rows_Scope |
|---|---|---|---|---|---|
| 1 | #_applications | DT1.TECH.1 | DT_IT_Types | DT_017_108_IT_Asset_Type | L2+1 |
| 2 | #_applications | DT1.TECH.1 | DT_Accountable_CIOs | DT_017_125_CIO | L1 |
| 3 | #_applications | DT1.TECH.1 | DT_IT_Types | DT_017_108_IT_Asset_Type | L2+1 |
| 4 | #_applications | DT1.TECH.1 | DT_Criticality | DT_017_127_IT_Asset_Criticality | L1 |
| 5 | #_applications | DT1.TECH.1 | DT_Accountable_CIOs | DT_017_125_CIO | L1 |
| 6 | #_applications | DT1.TECH.1 | DT_Process_Types | DT_015_104_Process_type | L1+2 |
| 7 | #_applications | DT1.TECH.1 | DT_Product_Types | DT_012_105_Product_Type | L1+1 |
| 8 | #_applications | DT1.TECH.1 | DT_Process_Types | DT_015_104_Process_type | L1+2 |
| 9 | #_applications | DT1.TECH.1 | DT_Product_Types | DT_012_105_Product_Type | L1+1 |
| 10 | #_applications | DT1.TECH.1 | DT_Organization_Units | DT_013_106_Organization_Unit | L2 |

| Key | Path_Ext_Columns | Path_Ext_Columns_DT_Name | Path_Ext_Columns_Scope |
|---|---|---|---|
| 1 | | | |
| 2 | DT-IT-Types | DT_017_108_IT_Asset_Type | L2+1 |
| 3 | DT-Organization-Units | DT_013_106_Organization_Unit | L2 |
| 4 | | | |
| 5 | DT-Criticality | DT_017_127_IT_Asset_Criticality | L1 |
| 6 | DT-Criticality | DT_017_127_IT_Asset_Criticality | L1 |
| 7 | DT-Criticality | DT_017_127_IT_Asset_Criticality | L1 |
| 8 | | | |
| 9 | | | |
| 10 | | | |

Figure 38

| Key | Information Item | Alias | Group |
|---|---|---|---|
| 1 | total.revenue.$CAD | | income.statement |
| 2 | net.interest.income.$CAD | NII | income.statement |
| 3 | non.interest.revenue.$CAD | NIR | income.statement |
| 4 | provision.for.credit.losses.$CAD | PCL | income.statement |
| 5 | insurance.claims.commissions.and.changes.in.policy.benefit.liabilities.$CAD | CCPB | income.statement |
| 6 | non.interest.expense.$CAD | NIX | income.statement |
| 7 | income.before.taxes.$CAD | IBT | income.statement |
| 8 | provision.for.income.taxes.$CAD | | income.statement |
| 9 | net.income.$CAD | NI | income.statement |
| 10 | net.income.attributable.to.bank.shareholders.$CAD | | income.statement |
| 11 | adjusted.total.revenue.$USD | | income.statement |
| 12 | adjusted.net.interest.income.$USD | NII | income.statement |
| 13 | adjusted.non.interest.revenue.$USD | NIR | income.statement |
| 14 | adjusted.provision.for.credit.losses.$USD | PCL | income.statement |
| 15 | adjusted.net.interest.income.and.non.interest.revenue.net.of.PCL.$USD | | income.statement |
| 16 | adjusted.insurance.claims.commissions.and.changes.in.policy.benefit.liabilities.$USD | CCPB | income.statement |
| 17 | adjusted.non.interest.expense.$USD | NIX | income.statement |
| 18 | adjusted.income.before.taxes.$USD | IBT | income.statement |
| 19 | adjusted.provision.for.income.taxes.$USD | | income.statement |
| 20 | adjusted.net.income.$USD | NI | income.statement |
| 21 | adjusted.revenue.growth.net.of.CCPB.$CAD | | income.statement |
| 22 | adjusted.non.interest.expense.growth.$CAD | | income.statement |
| 23 | earnings.per.share.growth.$CAD | | income.statement |
| 24 | revenue.growth.$CAD | | income.statement |
| 25 | non.interest.expense.growth.$CAD | | income.statement |
| 26 | net.income.growth.$CAD | | income.statement |
| 27 | share.price.$CAD | | shares.and.dividend |
| 28 | share.volume.number | | shares.and.dividend |
| 29 | earnings.per.share.$CAD | EPS | shares.and.dividend |
| 30 | loans.and.acceptances.$CAD | | balance.sheet |
| 31 | average.assets.$CAD | | balance.sheet |
| 32 | average.earning.assets.$CAD | | balance.sheet |
| 33 | average.net.loans.and.acceptances.$CAD | | balance.sheet |
| 34 | average.deposits.$CAD | | balance.sheet |
| 35 | allowance.for.credit.losses.$CAD | ACL | financial |
| 36 | return.on.common.equity.percent | ROE | financial |
| 37 | return.on.average.assets.percent | ROA | financial |
| 38 | effective.tax.rate.percent | | financial |
| 39 | operating.leverage.bps | | financial |
| 40 | credit.rating | | risk |
| 41 | percent.loans.delinquent.over.90.days | | risk |
| 42 | interest.rate.percent | | economic |

Figure 39

| Key | Keyword | Keyword-Type | Keyword-Group | Help |
|---|---|---|---|---|
| 1 | number | metric | arithmetic | |
| 2 | rate | metric | arithmetic | |
| 3 | volume | metric | arithmetic | |
| 4 | revenue | metric | income statement | |
| 5 | interest | metric | income statement | |
| 6 | expense | metric | income statement | |
| 7 | CCPB | metric | income statement | Insurance claims, commissions and changes in policy benefit liabilities |
| 8 | income | metric | income statement | |
| 9 | tax | metric | income statement | |
| 10 | provision | metric | income statement | |
| 11 | allowance | metric | income statement | |
| 12 | earnings | metric | shares and dividend | |
| 13 | share | metric | shares and dividend | |
| 14 | dividend | metric | shares and dividend | |
| 15 | assets | metric | balance sheet | |
| 16 | liabilities | metric | balance sheet | |
| 17 | deposits | metric | balance sheet | |
| 18 | loans | metric | balance sheet | |
| 19 | acceptances | metric | balance sheet | |
| 38 | before | modifier | inclusion | |
| 39 | gross | modifier | inclusion | |
| 40 | after | modifier | exclusion | |
| 41 | non | modifier | exclusion | |
| 42 | net | modifier | exclusion | |
| 43 | and | modifier | addition | |
| 44 | for | modifier | purpose | |
| 45 | in | modifier | enclosure | |
| 46 | average | qualifier | arithmetic | |
| 47 | growth | qualifier | arithmetic | |
| 48 | high | qualifier | arithmetic | |
| 49 | low | qualifier | arithmetic | |
| 50 | close | qualifier | arithmetic | |
| 51 | change | qualifier | arithmetic | |
| 52 | $CAD | qualifier | currency | Canadian dollar |
| 53 | $USD | qualifier | currency | U.S. dollar |

Figure 40

|    | L1              | L2                               | L3                                             |
|----|-----------------|----------------------------------|------------------------------------------------|
| 1  | Adv & Marketing | Customer Reward Programs         | Customer Reward Programs                       |
| 2  | Adv & Marketing | Direct Marketing                 | Other Direct Marketing                         |
| 3  | Adv & Marketing | Direct Marketing                 | Telemarketing                                  |
| 4  | Adv & Marketing | Creative                         | Print                                          |
| 5  | Adv & Marketing | Media                            | Media Agency Fees                              |
| 6  | Adv & Marketing | Media                            | Agency Fees                                    |
| 7  | Adv & Marketing | Media                            | Media Buy                                      |
| 8  | Adv & Marketing | Promotions & Sponsorship         | Promotions                                     |
| 9  | Adv & Marketing | Public Relations                 | Public Relations                               |
| 10 | Adv & Marketing | Meetings and Events              | Meetings and Events                            |
| 11 | Adv & Marketing | Marketing Research               | Marketing Research                             |
| 12 | Adv & Marketing | Creative                         | Production                                     |
| 20 | Business Ops    | Market & Financial Data          | Trading                                        |
| 21 | Business Ops    | Meetings, Events & Entertainment | Meetings and Events                            |
| 22 | Business Ops    | Meetings, Events & Entertainment | Restaurants                                    |
| 23 | Business Ops    | Office Equipment                 | Office Equipment                               |
| 24 | Business Ops    | Enterprise Operation Services    | Office Supplies                                |
| 25 | Business Ops    | Enterprise Operation Services    | Records Management                             |
| 26 | Business Ops    | Shipping, Courier & Mail         | Mailroom Management                            |
| 27 | Business Ops    | Shipping, Courier & Mail         | Postal Products and Services                   |
| 28 | Business Ops    | Shipping, Courier & Mail         | Courier Services                               |
| 29 | Business Ops    | Shipping, Courier & Mail         | Shipping, Courier & Mail                       |
| 30 | Business Ops    | Transportation                   | Aircraft Operating Expenses                    |
| 31 | Business Ops    | Transportation                   | Fleet Services                                 |
| 40 | Business Ops    | Financial & Insurance Services   | Appraisers & Title Search                      |
| 41 | Business Ops    | Investment Services              | Banking Transactions                           |
| 42 | Business Ops    | Financial & Insurance Services   | Cards                                          |
| 43 | Business Ops    | Financial & Insurance Services   | Currency Operations                            |
| 44 | Business Ops    | Financial & Insurance Services   | Debt Collection Services                       |
| 45 | Business Ops    | Financial & Insurance Services   | FundsTransfer & Clearance & Exchange Services  |
| 46 | Business Ops    | Financial & Insurance Services   | Insurance & Retirement Services                |
| 47 | Business Ops    | Banking Services                 | Appraisers & Title Search                      |
| 48 | Business Ops    | Banking Services                 | Cards                                          |
| 49 | Business Ops    | Equities & Securities Services   | Stock Market Fees & Services                   |

Figure 41

| MAP table type | Data Sources | | |
| --- | --- | --- | --- |
| | MAP | Enterprise | External |
| Configuration Files (CF) | ☑ | | |
| Dimension tables for views (DTV) | ☑ | | |
| Dimension tables for information (DTI) | ☑ | | |
| Dimension tables for keywords (DTK) | ☑ | | |
| Core dimension tables (DT) | ☑ | | |
| Dimension table for unstructured data (DTU) | ☑ | | |
| Fact catalogues (FC) | ☑ | ☑ | ☑ |
| Fact journals (FJ) | ☑ | ☑ | ☑ |
| Unstructured data items (UDI) | ☑ | ☑ | ☑ |

Figure 42

|  | Generation 1 | Generation 2 | Generation 3 |
|---|---|---|---|
| Car | Paper Maps | GPS | Self-Driving Car |
| Aircraft | Paper Maps | Basic Avionics | Auto-Pilot |
| Bank | Paper Reports | Business Intelligence | MAP Robotic Manager Platform |

SYSTEM AND METHOD FOR BUILDING AND USING ROBOTIC MANAGERS

CROSS-REFERENCE TO RELATED APPLICATION

The present patent application claims priority to U.S. Provisional Patent Application No. 62/474,168, entitled "Unified Navigation and Analytics System and Method", filed Mar. 21, 2017, which is incorporated herein in its entirety, by reference thereto.

BACKGROUND OF THE INVENTION

There are various tools available today to assist with tasks performed by a manager in a business or other organization. For example, various data visualization, graph databases, in-memory databases, machine learning libraries and related tools exist. However, there does not exist a fully integrated solution including software platform, data model, implementation method/tools as well as pre-populated data sets and configuration files to quickly implement expert and basic skills.

SUMMARY OF THE INVENTION

In one embodiment, the present invention may be implemented as a software platform, data model and method to build robotic managers (RM). The system of the present invention is referred to herein as the "MAP System" or "MAP". MAP is described herein using examples in banking, but MAP RM solutions are not limited to banking as MAP may be used to build RMs in other industries and in non-enterprise domains.

A robotic manager is, in one embodiment, a computer system that automates tasks performed by a human manager. A MAP RM has a skillset which may be divided into two categories: 1) basic skills such as visual recognition, voice command processing, data visualization, unstructured search, and 2) expert skills such as finance, risk management, cyber security, and information technology. Expert skills may be categorized by domain. In one embodiment, there may be two types of RMs:

Single-domain RMs which have expert skills in one domain.

Multi-domain RMs which have expert skills in multiple domain. In these cases, skills in one domain may be used to enhance skills in other domains. For example, skills in cyber security and information technology may be used to enhance skills in fraud management.

A MAP RM may be built using the MAP platform, data model and method. The MAP platform may include re-usable software and data components. Re-usable components are designed to accelerate and simplify the design, implementation and maintenance of MAP RMs.

The MAP method enables the gradual, parallel and iterative implementation of RMs. Using the MAP platform and data model with this method enables multiple teams to work in parallel to build a RM with a broad set of expert skills which are integrated across domains and where expert and basic and expert skills work together seamlessly. Moreover, breadth and depth of both expert and basic skills may be enhanced, as needed, using an iterative method. For example, a RM may evolve as follows through multiple iterations: (1) from single-domain to multi-domain, (2) for each expert domain, the skillset may be enhanced by: adding new skills or improving existing skills, (3) basic skills may also be improved, for example by adding data visualization widgets, language skills, data management and analytic management skills.

BRIEF DESCRIPTION OF THE DRAWINGS

FIG. 3 depicts a MAP domain architecture, in an enterprise/banking example.

FIG. 7 depicts domains of an implementation of MAP in a bank.

FIG. 8 depicts data grid, graph, analytics and services of an implementation of MAP in a bank.

FIG. 9 depicts basic skills in a MAP platform.

FIG. 12 depicts the icons corresponding the specific controls in the user interface.

FIG. 14 depicts financial metrics displayed in list widget, in a sample MAP user interface.

FIG. 15 depicts financial metrics displayed in news widget, in a sample MAP user interface.

FIG. 16 depicts financial metrics displayed in table widget with scroll bars, in a sample user interface.

FIG. 17 is a table widget example.

FIG. 18 is a news widget example.

FIG. 19 is a geo-map widget example.

FIG. 20 is a tree widget example.

FIG. 21 is a structure widget example.

FIG. 22 is a relationship widget example.

FIG. 23 is a sunburst widget example.

FIG. 24 is a help widget example.

FIG. 25 is an example of the catalogue features in the summaries widget.

FIG. 26 is an example of the components of a summaries widget.

FIG. 27 is an example of the playback features in the summaries widget.

FIG. 28 is an example of the storyline features in the summaries widget.

FIG. 29 depicts examples of application and data adapters.

FIG. 31 depicts domains in one embodiment of a bank RM.

FIG. 37 depicts an example of dimension table views (root menu), in accordance with an embodiment.

FIG. 38 depicts an example of dimension table views (information technology), in accordance with an embodiment.

FIG. 39 depicts an example of dimension table information (financial metrics), in accordance with an embodiment.

FIG. 40 depicts an example of dimension table keywords, in accordance with an embodiment.

FIG. 41 depicts an example of a dimension table, in accordance with an embodiment.

FIG. 42 depicts different data sources used for each MAP table type, in accordance with embodiment.

FIG. 43 depicts MAP RM evolving business intelligence, data, and analysis, in accordance with an embodiment.

DETAILED DESCRIPTION OF THE INVENTION

MAP Overview

Figure 1:
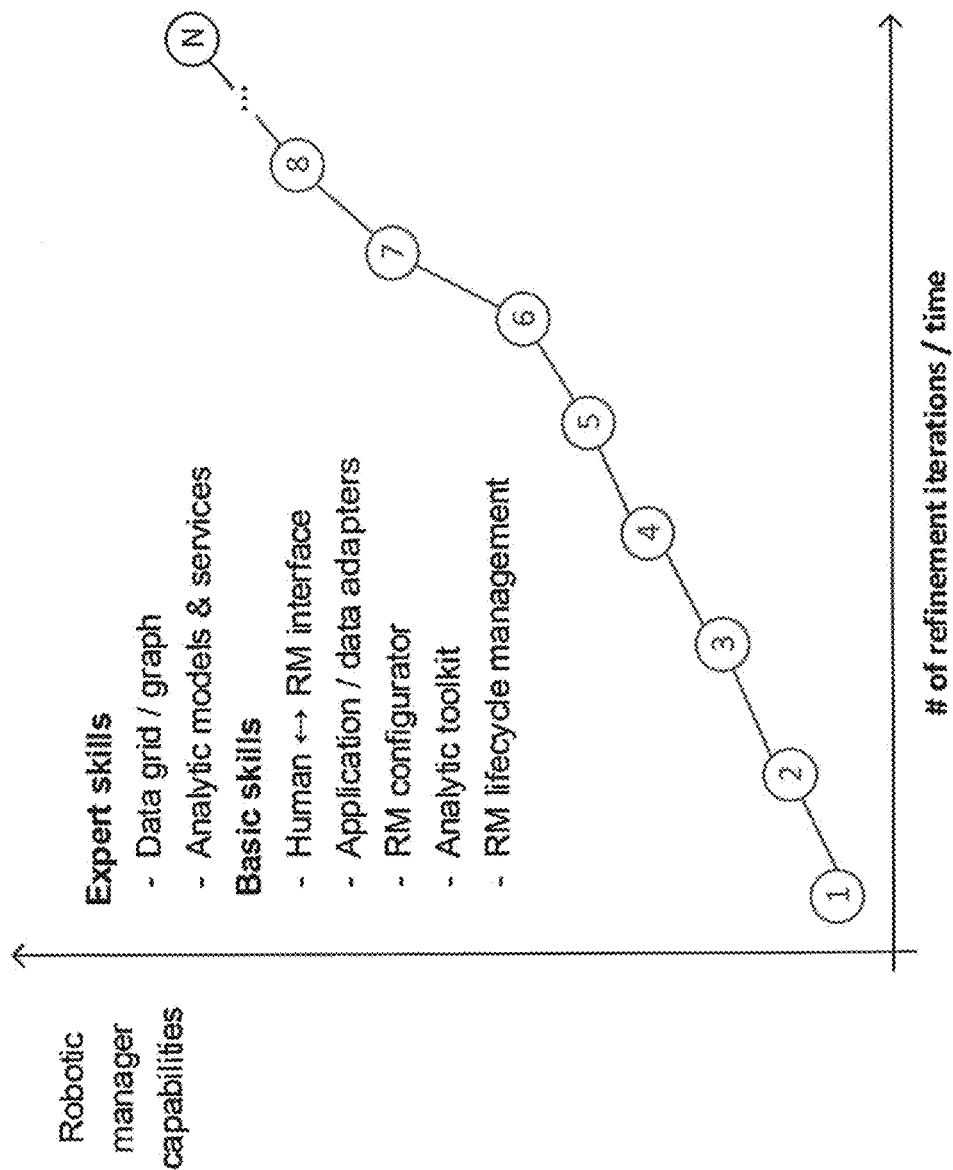
FIG. 1 is a chart showing improving MAP RM capabilities through multiple iterations.

FIG. 1 illustrates how the overall skills and capabilities of a MAP RM are improved over time through multiple iterations (1 through N). Utilizing the MAP platform, data model and method ensures that the skills added or improved with each iteration make the system more powerful while preserving the consistency and integrated nature of both user experience and data/analytic capabilities.

Figure 2:
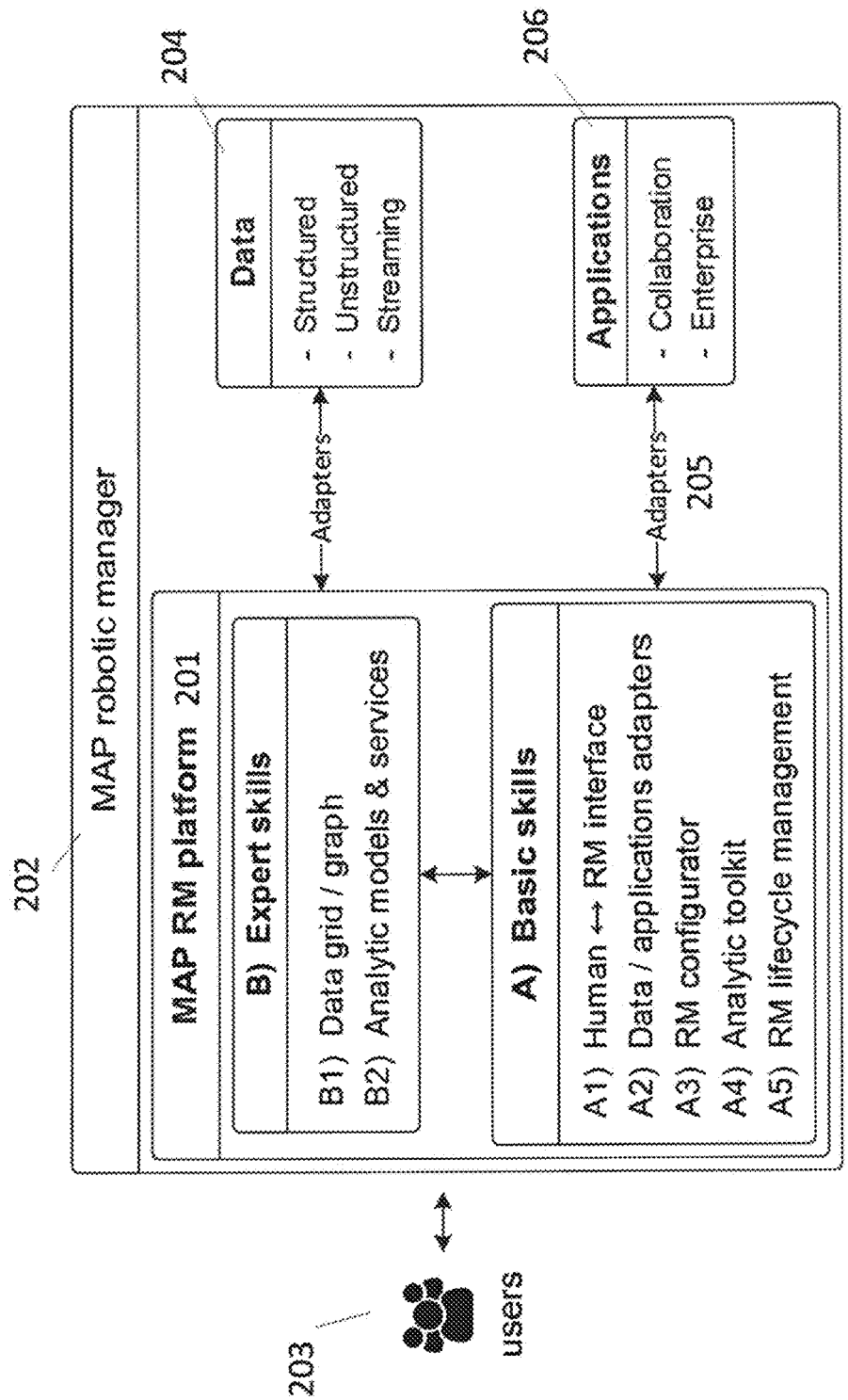
FIG. 2 depicts the MAP platform, in one embodiment.

FIG. 2 illustrates how a robotic manager (RM) 202 is assembled with the MAP RM platform 201 of the present invention. RM skills may be divided into two categories: (A) basic skills, and (B) expert skills which may be sub-divided by domain.

Examples of basic skills include the ability to respond to voice/text commands, display information in multiple chart formats and view statistics on the contents and usage of the data grid/graph and analytics.

Expert skills may be domain-specific; for example: finance, risk management, information technology, cyber security, data and analytics. Expert skills may comprise domain data grids/graphs, analytic models and services which together with basic skills and data constitute a fully configured RM.

MAP robotic managers are designed to augment human skills. Through iterations, it is possible to improve the skills of a MAP RM to a level where the RM replaces the need for human skills for specific tasks. A MAP RM may augment human intellectual abilities in the following ways:

Increase the speed with which a user can understand complex data sets with simple, optimal data visualization and explanations Enhance the user's ability to understand a wide range of concepts, sub-concepts and relationships between them Give the user the ability to continuously monitor changes in a wide range of domains including millions/billions of facts and be alerted to conditions requiring attention Augment the user's ability to quickly diagnose issues and identify root-cause Enhance the user's ability to lead teams and collaborate to solve complex problems by seamlessly navigating through information from across multiple domains.

MAP: Distinctive Characteristics and Benefits

Exemplary Characteristics

Figure 4:
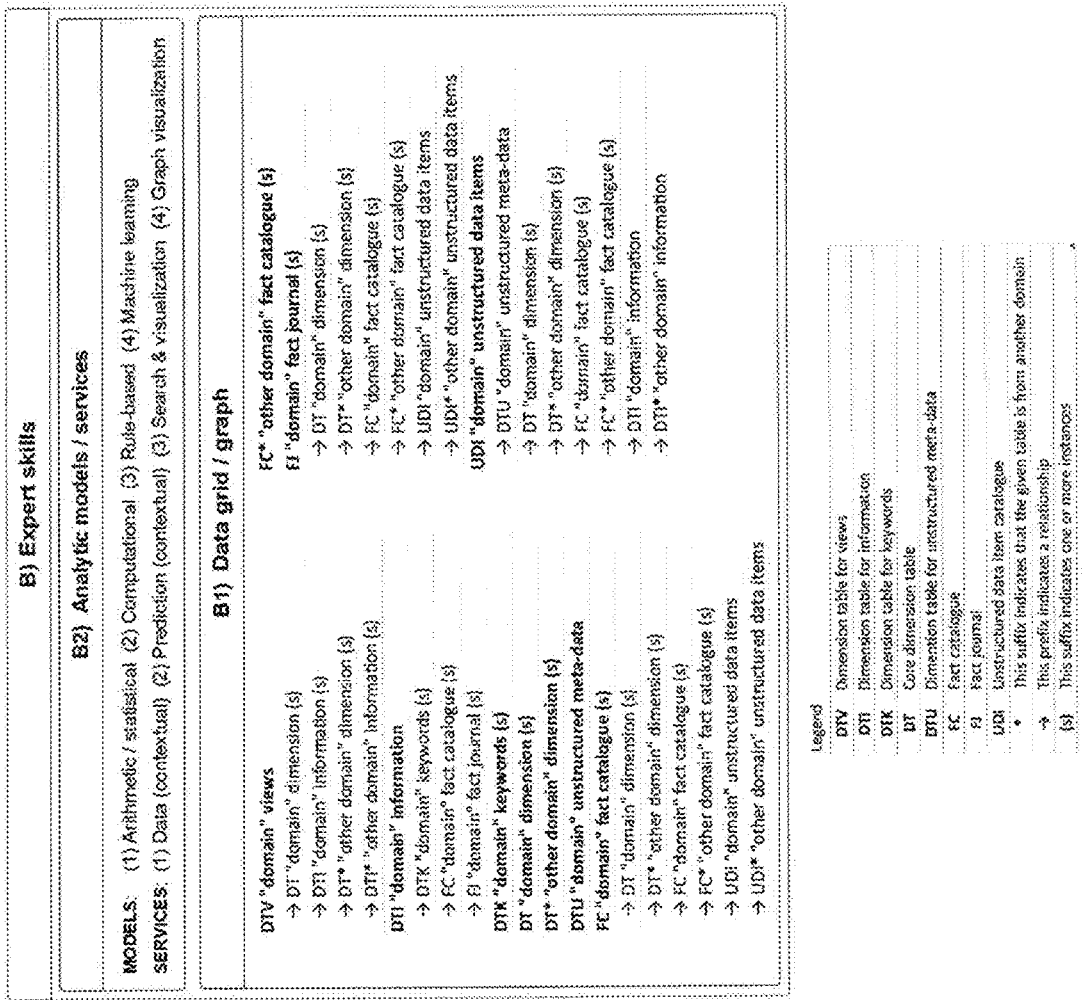
FIG. 4 is an exemplary expert skills architecture of the MAP platform.

1. Platform architecture: FIGS. 2, 4 and 9 describe the components of the MAP platform architecture which in one embodiment help achieve the desired benefits.

Figure 5:
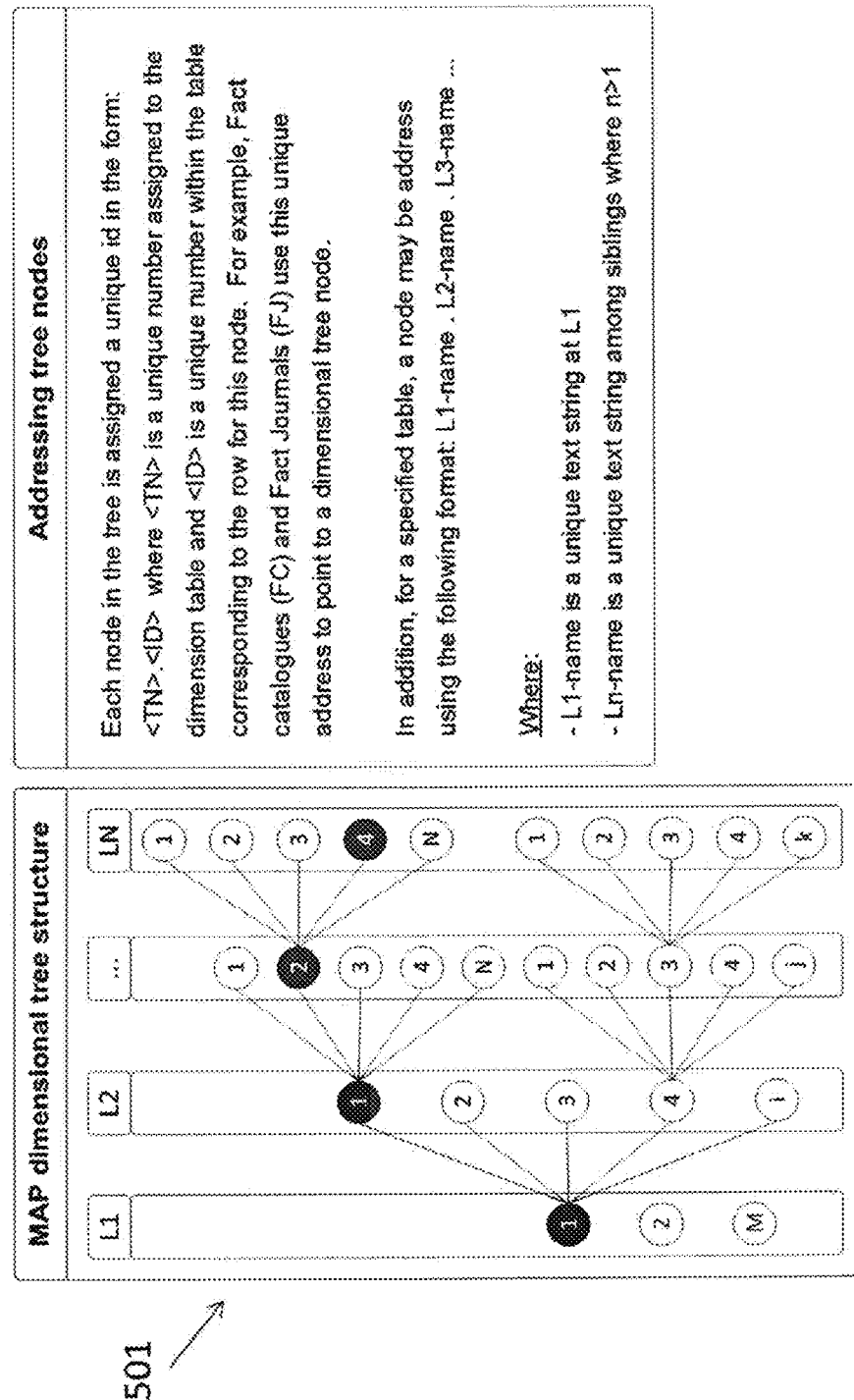
FIG. 5 depicts a MAP dimensional tree structure and node address.

2. Data grid/graph architecture: FIGS. 4 and 5 along with Tables 1 to 10 describe the components of the MAP data grid/graph architecture which in one embodiment help achieve the desired benefits.

Figure 30:
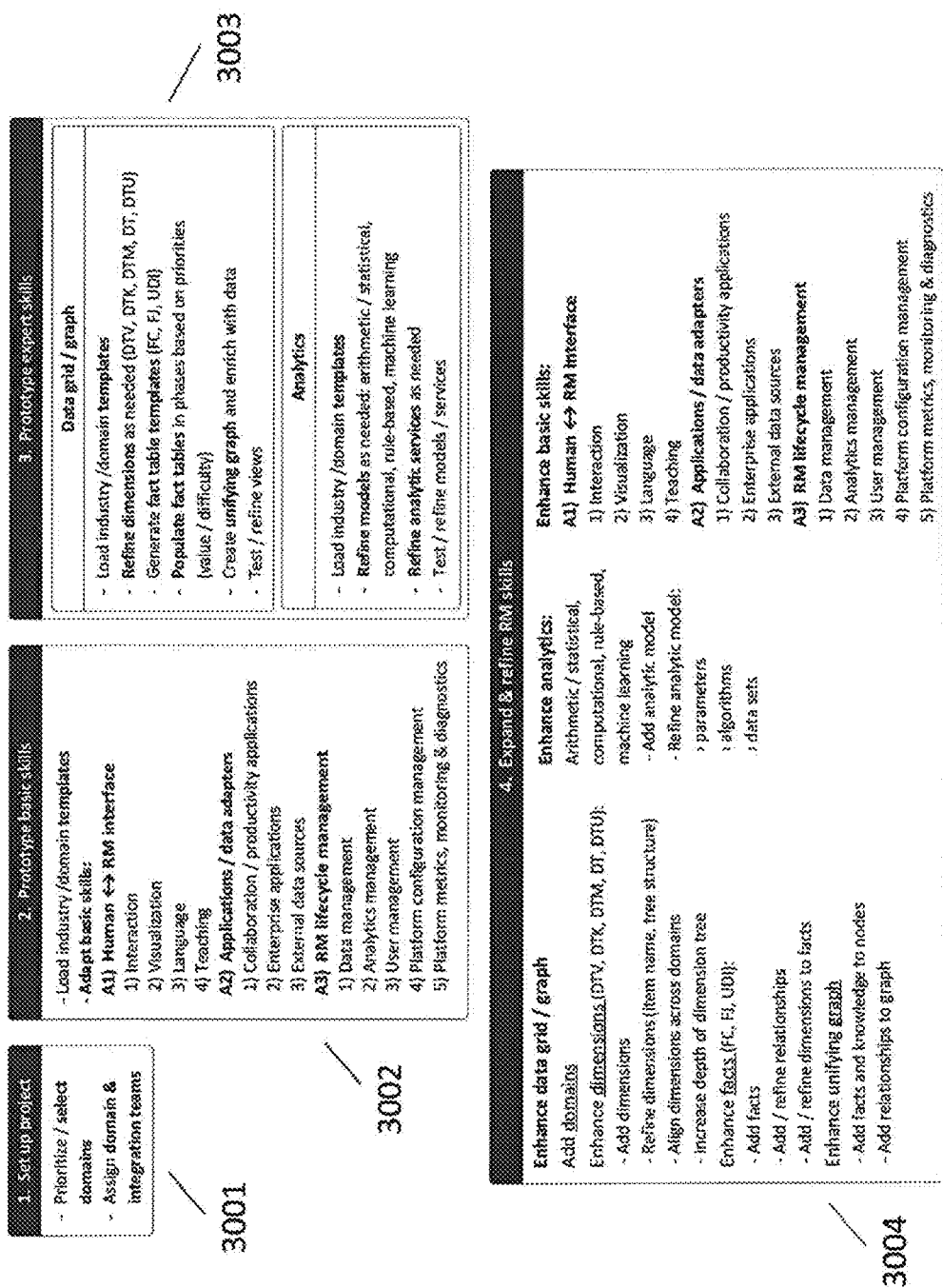
FIG. 30 shows an exemplary MAP RM rapid prototyping, implementation, refinement and scaling method.
Figure 34:
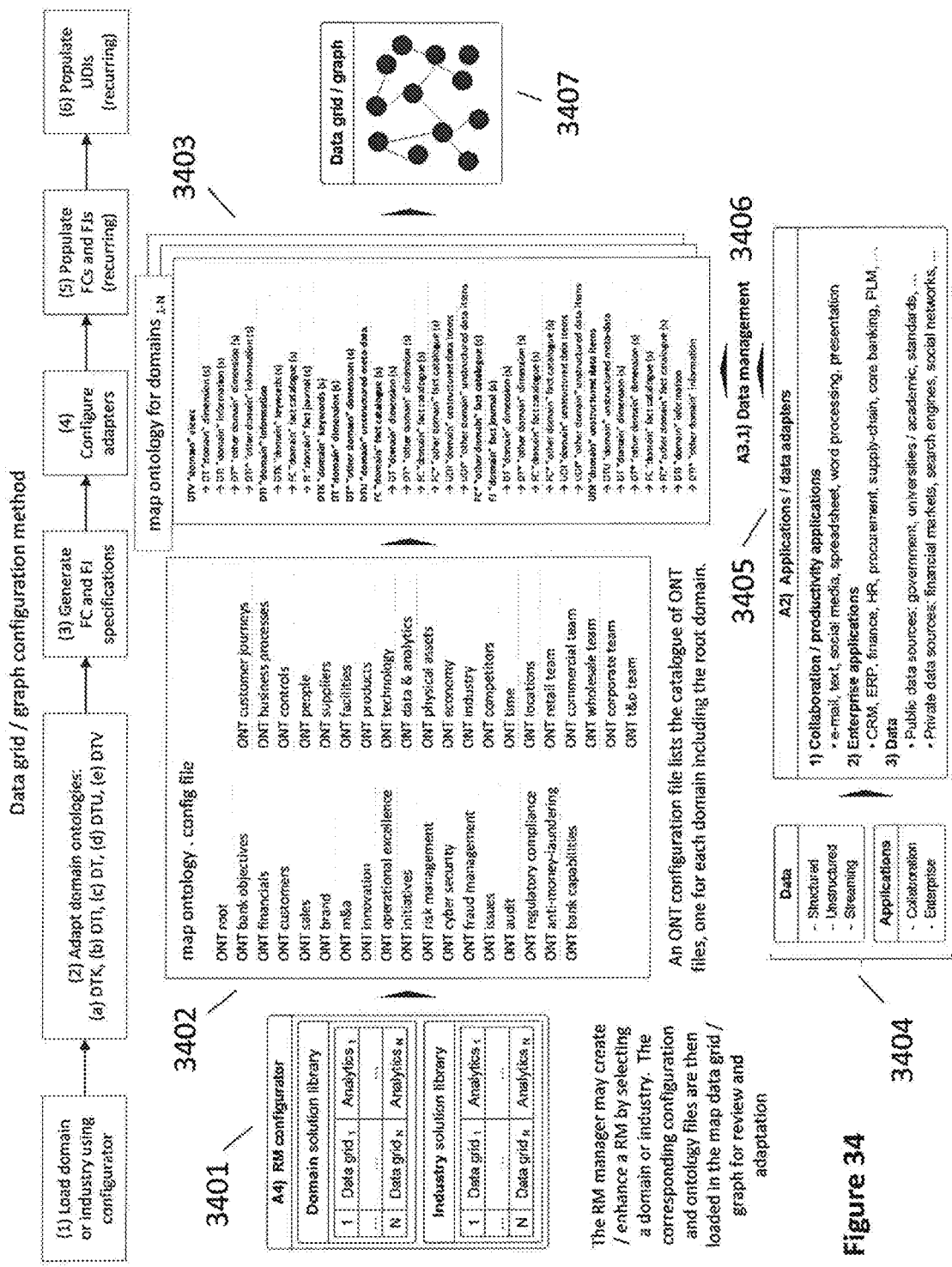
FIG. 34 depicts the method to configure a map data grid/graph.

3. Rapid prototyping and parallel RM implementation method and tool with multiple teams working on distinct domains: FIGS. 30 and 34 describe the MAP implementation method and tools which may enable rapid scaling and implementation of a MAP RM with a broad set of capabilities including breadth and depth of data/analytics and seamless user interface. This method may help to achieve the desired benefits.

4. The user interface delivers precise answers to specific questions and enables users to navigate a large and complex data/knowledge base with speed and simplicity. FIGS. 10 to 28 along with Tables 10 to 13 describe the MAP user interface in exemplary embodiments which may help to achieve the desired benefits.

5. Technical implementation approach: Table 15 describes the components of the MAP technical implementation approach which may help achieve the desired benefits.

6. Data management method and tool: FIG. 9 and section A5.1 describe the elements of the MAP data management method and tool which may help achieve the desired benefits.

7. Analytics management method/tool: FIG. 9 and section A5.2 describe the elements of the MAP analytic management method and tool which may help achieve the desired benefits.

8. User management method/tool: The MAP user management method and tool (section A5.3) is designed to work together with the platform and data grid/graph to enable the assignment of precise user access rights (data access, analytics access) for each individual RM user 203. This may help ensure information security and data privacy.

Exemplary Benefits

1. RM Implementation—faster and simplified

Rapid prototyping & development using templates, configurator, pre-configured data sets, pre-configured models and micro-services library Parallel implementation method with multiple teams Efficient data management and analytics management methods and tools Ability to start with a simple/narrow scope (domains/skills) and gradually/quickly enhance the breadth and depth of RM capabilities (domains, data, analytics).

2. RM Solutions—breadth, depth, simplicity, quality and consistency

User interface simplicity, quality and consistency across domains and skills

Precision and speed of response to user commands across domains and skills

Breadth and depth of basic and expert skills

RM skills may be improved iteratively with a standard method/toolkit yielding continuous improvement in RM capabilities MAP Robotic Manager: Case Example In order to illustrate the capabilities of MAP we use a case example where we assemble a Robotic Manager in banking. In this example, we configure the RM to have a broad skillset. Specifically, the RM is configured to have skills in 37 domains (301) as shown FIG. 3. The majority of these skills are re-usable across industries with minor configuration adaptations. For example, people, suppliers, facilities, information technology and cyber security are industry agnostic skills.

MAP: Expert Skills

Expert skills may be configured using a standard architecture which includes a data grid/graph, analytic models and analytic services as shown in FIG. 4.

FIG. 4 is described in further detail below, with respect to its associated lettering scheme.

B1) Map Data Grid/Graph

The MAP data grid/graph is a data model representing the RM's knowledge/expertise. The data grid/graph may be assembled using the following table types:

DTV—Dimension Table for Views—DTVs describe the format and content of Views to present specific information to the user. One or more DTV files are created for each Domain thereby creating a catalogue of Views that may be requested by the user. In a given domain, a DTV may point to core dimension tables (DTs) and/or dimension tables for information (DTIs). DTs and DTIs may be in the current domain or another domain.

DTI—Dimension Table for Information—DTIs specify information which may be a metric (e.g. FTE, NIX, NIX/FTE, Gross Spend, etc.) or any other information that is available in the given domain (e.g. name, address, photos, videos, documents, etc.). One or more DTI files are created for each Domain to specify a catalogue of information that is available to create Views. In a given domain, a DTI may point to dimension table(s) for keywords (DTK), fact catalogue(s) (FCs), and/or fact journal(s) (FJs). DTK—Dimension Table for Keywords—DTKs specify keywords that may be combined to name metrics. Keywords are used as "clues" by the user command processing algorithm (voice or search). For example, voice commands may include multiple keywords referring to information and dimensions.

DT—Core Dimension Tables—Core DTs specify the structure of concepts. A concept is disaggregated into "N" levels using a L1, L2, L3, . . . LN structure.

DTU—Meta-Data for Unstructured Data—DTUs specify the meta-data for unstructured data items. For example, the type of file such as audio, video, spreadsheet as well as the specific type of file: Word, Excel, Power Point, PDF, as well as the concepts and sub-concepts to which the unstructured data item belongs (e.g. information technology) infrastructure>computing) server).

FC—Fact Catalogue—FCs specify the list of items corresponding to a concept along with their associated attributes. For example: facilities catalogue, IT application catalogue, employee catalogue. In a given domain, Fact Catalogues may point to core dimension tables (DTs), other Fact catalogues (FCs), unstructured data items (UDIs). DTs, FCs, UDIs may be in the current domain or another domain.

FJ—Fact Journal—FJs specify time stamped event information. Examples include financial transaction (revenue, expense), customer interactions (branch visit, digital transactions). In a given domain, Fact Journals (FJs) may point to core dimensions (DTs), Fact Catalogues (FCs), Unstructured Data Items (UDIs). DTs, FCs, UDIs may be in the current domain or other domains.

UDI—Unstructured Data Items—UDIs contain unstructured data items. Examples include: photos, videos, audio files, documents, etc. In a given domain, UDIs may point to the Dimension table describing the meta-data for the given unstructured data item (DTU), Core dimension tables (DTs), Fact Catalogues (FCs), Dimension Tables for Information (DTIs). DTs, FCs, DTIs may be in the current domain or other domains.

As depicted in FIG. 5, DTVs, DTIs, DTKs, DTs, and DTUs may be built using the MAP dimensional tree structure 501. A tree has "N" levels. A node address may be specified in one of two formats:

| | |
|---|---|
| Name-path | <L1 -name>.<L2-name>.<L3 -name> |
| ID-path | <TN> <ID> where <TN> is a unique number assigned to the dimension table and <ID> is a unique number within the table corresponding to the row for this node. |

Note: In one embodiment, the character "." is used by the software to delineate distinct names in a path. Therefore, in this example, "." cannot be used in a node name.

MAP Dimensional Tree Grammar

The MAP dimensional tree grammar may be used to specify a subset of a map dimensional tree.

Parameter values and corresponding tree scope, in one embodiment, are described below, in

TABLE 1

MAP dimensional tree grammar

| Parameter value | Scope |
|---|---|
| (blank) | Entire tree |
| Level = LN | Entire tree up to Level LN |
| Node = name · name | A specific node in the tree |
| Node + 1 = name. name | A specific node in the tree and 1 level below |
| Node + N = name. name | A specific node in the tree and N levels below |
| Node++ = name. name | A specific node in the tree and all levels below |

Dimension Table—Views (DTV)—Record Format and Example

DTV examples are provided in Table 2 and FIGS. 37 and 38:

TABLE 2

DTV record format

| Record Attribute | Description |
|---|---|
| Key | Unique key for each record |
| DTI-Domain | Domain specification for information |
| Metric-Group | Metrics are organized in groups |
| L1 | Level 1 text string |
| . . . | L2, L3 . . . attributes are added as needed for additional depth in structure |
| LN | Level "N" text string |
| Metric-Unique-String | Unique name for the metric |
| DTI-Key | Unique key for the information to be displayed |
| Path-Ext-Rows | Specifies a dimension to extend the view along Rows. This enables dimensional disaggregation along Rows. |
| Path-Ext-Rows-Scope | Specifies the scope of the above DT to be used. This is specified using the MAP tree grammar. |
| Path-Ext-Columns | Specifies a dimension to extend the view along Columns. This enables dimensional disaggregation along Columns. |
| Path-Ext-Columns-Scope | Specifies the scope of the above DT to be used. This is specified using the MAP tree grammar. |
| Service-ID | Specifies the micro-service to be used to generate this View. |

MAP Domain Grammar

A grammar may be specified for each domain to enhance search and voice capabilities. In one embodiment, the MAP domain grammar may be implemented with two table types: information (DTI) and keywords (DTK).

An entry in the DTI is a text string assembled with keywords (or non-keyword text) separated by a "."

Figure 10:
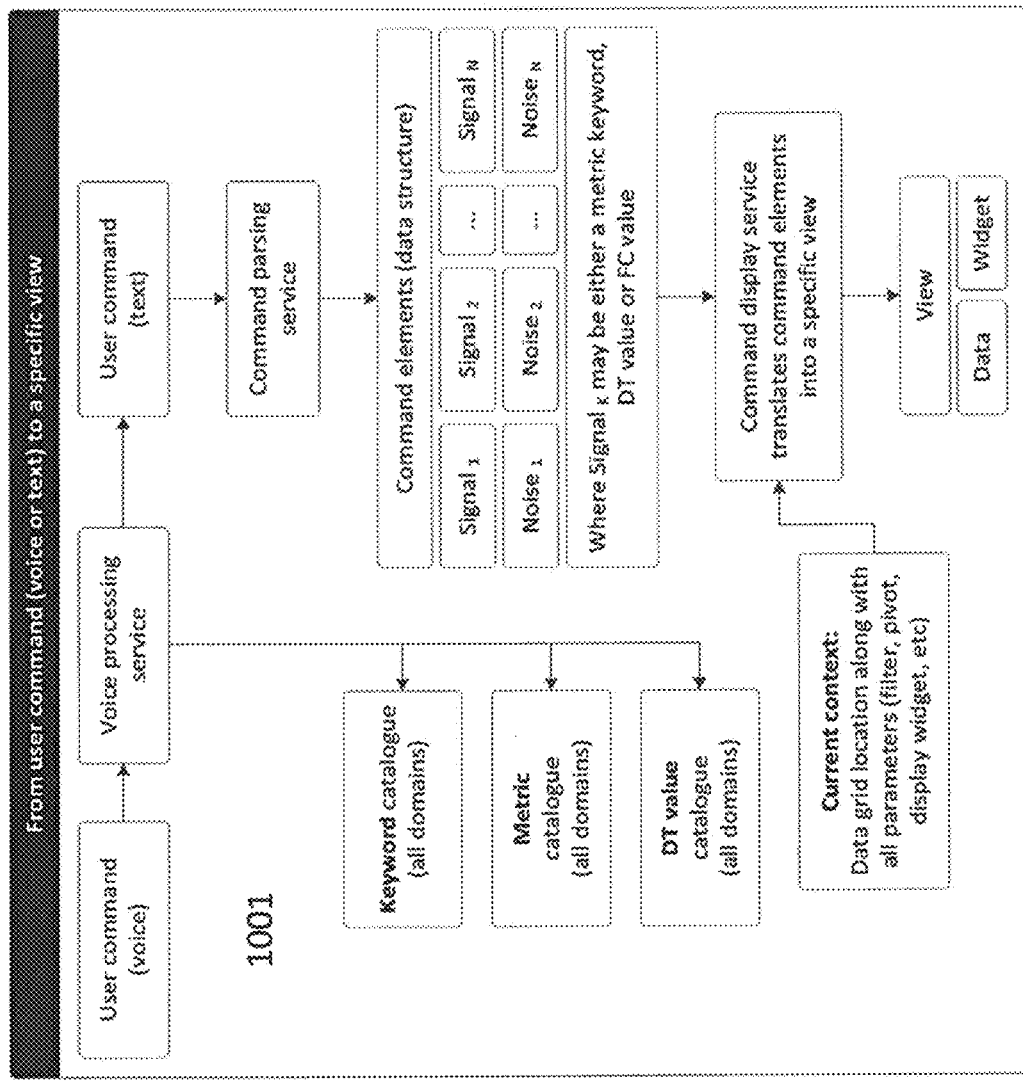
FIG. 10 depicts voice/text user command processing in a User 4→RM interaction example.

In one embodiment, the MAP system includes a parser to extract keywords from DTI entries and instantiate a model that is used to navigate the data grid/graph (direct navigation model). As illustrated in FIG. 10, this model analyzes search queries and voice commands to determine the specific view to be displayed.

Table 5 illustrates the DTI record format and Table 7 depicts the DTK record format.

Combining the information in DTIs, DTKs, DTs along with the current context (location in the data grid/graph), the direct navigation model can process a voice command or unstructured search query and present a specific view or a narrow, ranked set of view options.

Dimension Table—Information (DTI)—Record Format and Example

DTI examples are provided in Tables 5 and FIG. 39:

TABLE 5

DTI record format

| Record Attribute | Description |
| --- | --- |
| Key | Unique key for each record |
| Information-Item | Unique name for this information item. Information items follow the MAP metric grammar with the following format: KW-1.KW-2.KW-3.KW-n Where KW is a keyword specified in a DTK. |
| Alias | Alias are included for reference to the domain team. |
| Group | Information items are classified in groups |
| Fact Table | Pointer to the Fact Catalogue or Fact Journal containing the values for this information item |

Dimension Table—Keywords (DTK)—Record Format and Example

DTK examples are provided in Tables 7 and FIG. 40, below:

TABLE 7

DTK record format

| Record Attribute | Description |
| --- | --- |
| Key | Unique key for each record |
| Keyword | A keyword is a continuous text string (no spaces) which is used to assemble metrics |
| Keyword-Type | Keywords are classified in types to support search features. Examples of keyword types include: metric, modifier, qualifier |
| Keyword-Group | Keywords are classified in groups |
| Help | Help is a text string that describes the keyword. This is useful in cases such as acronyms where the keyword may require some explanation |

Dimension Table—(DT)—Record Format and Example as illustrated in table 9 and FIG. 41:

TABLE 9

DT record format

| Record Attribute | Description |
| --- | --- |
| Key | Unique key for each record |
| L1 | Level 1 text string |
| . . . | L2, L3 . . . attribute are added as needed for additional depth in structure |
| LN | Level "N" text string |

Figure 6:
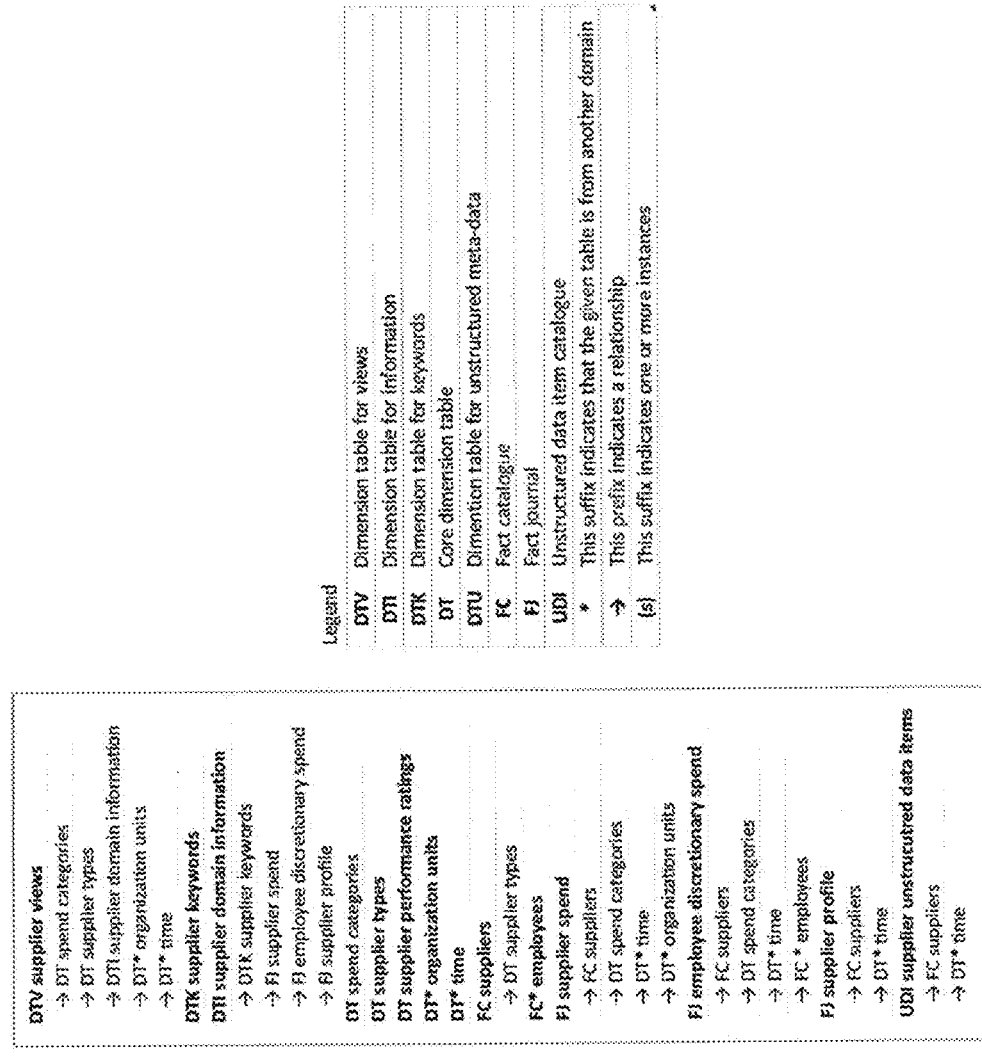
FIG. 6 is a simplified supplier data grid/graph example.

FIG. 6 illustrates a simplified data grid/graph 601 for the supplier domain. In this example, three fact journals provide the information on supplier spend: "FJ supplier spend", "FJ employee discretionary spend" and "FJ supplier profile". The two supplier spend journals point to the spend category dimension table and the supplier catalogue. "FJ supplier spend" also points to organization unit dimension table while "FJ employee discretionary spend" points to the employee catalogue. This simple model enables views of supplier spend and employee discretionary spend by category, by organization unit, by employee and by supplier. In addition, "FJ supplier profile" contains additional information on suppliers, for example, name, headquarter location, management team, web site, etc.

An ontology (ONT) file is specified for each domain. A domain ontology file describes the data grid/graph for the given domain. An example of an ONT file for the supplier domain is shown in FIG. 6. The ONT file contains the list of tables and the relationships between tables required to assemble the given domain data grid/graph: DTVs, DTIs, DTKs, DTs, DTUs, FCs, FJs, UDIs The * suffix indicates that the given table is from another domain. For example, the dimension table "DT organization unit" is used in the supplier domain, however is located in the people domain. Therefore, the file is named "DT* organization units" in this ONT file.

The → prefix indicates a relationship. For example, "DTV supplier views" points to multiple tables. Some of these tables are within the supplier domain (DTI supplier domain information, DT spend categories, FC suppliers) and some tables are in other domains (DT* organization units, FC* employees).

Example of Expert Skills Implementation in a Bank

The first step in implementing expert skills is to disaggregate the problem into domains. FIG. 7 is an example of domains for a bank.

Figure 8:
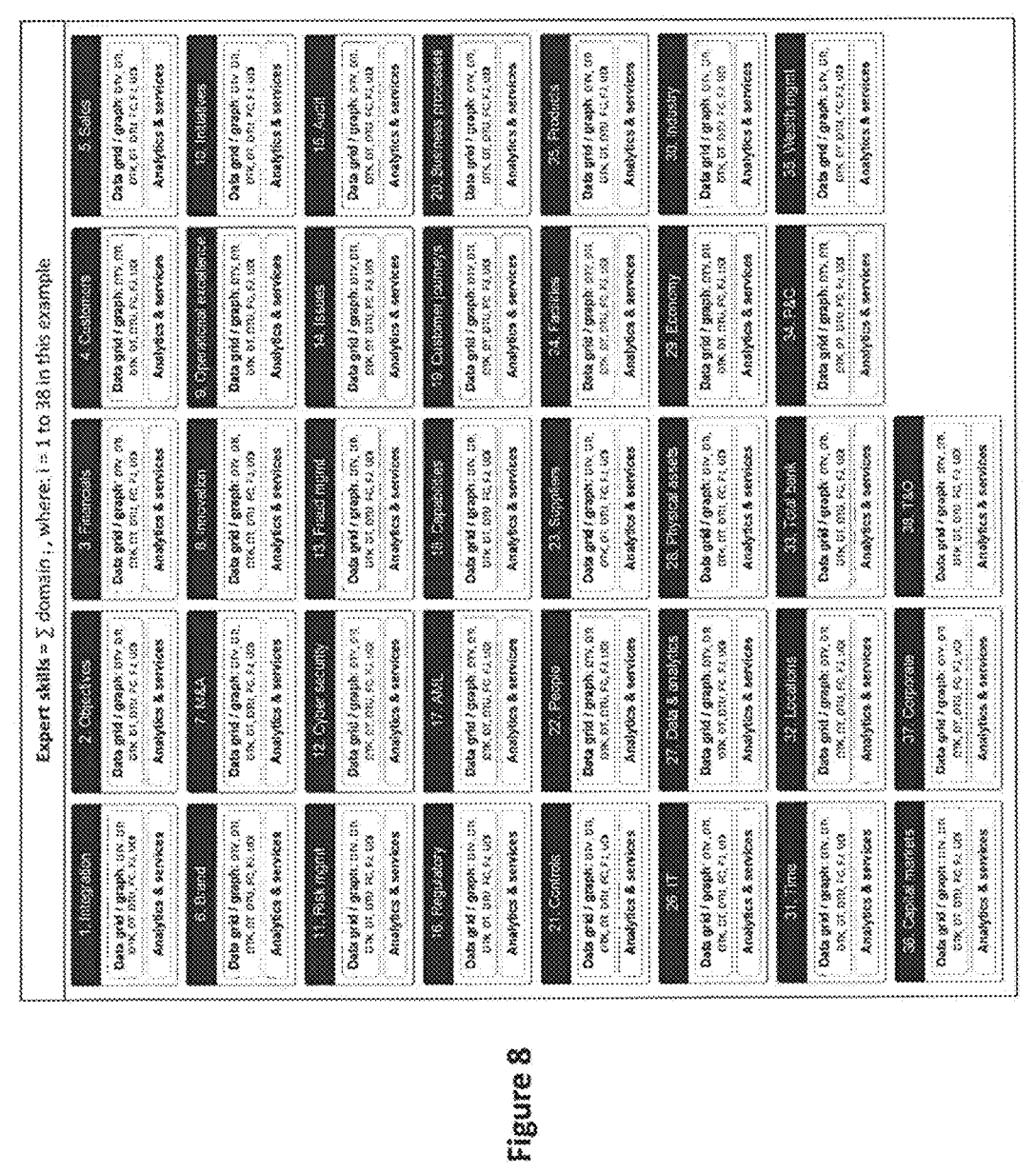

FIG. 8 illustrates how the above domains may be further disaggregated into a data grid/graph, analytic solutions and analytic services to assemble the robotic manager(s).

B2) Graph Model

In one embodiment, the MAP data grid/graph may include 7 types of tables:
DTV—Dimension tables for views
DTI—Dimension tables for information
DTK—Dimension tables for keywords
FC—Fact catalogues
FJ—Fact journals
DTU—Dimension tables for unstructured data (metadata)
UDI—Unstructured data items This data grid/graph is used to enable multiple types of analytic models and services including: arithmetic/statistical, computational, rule-based, machine learning, graph (e.g. path, community, connectivity, centrality, machine learning) as well as analytic services such as data with context, prediction with context, search and visualization, and graph visualization. The data grid/graph is enriched with data from multiple sources (internal, external) and of multiple types (structured, unstructured, streaming) (204 in FIG. 2 and 3406 in FIG. 34). The analytic toolkit provides tools to parse structured and unstructured data and attach this data to the graph. This automation enables the creation of a graph with extensive attributes. The base data model (loaded using the configurator) defines the structure of concepts and declared relationships between concepts.

Once this model is in graph format, analytic algorithms may enrich the graph with additional facts attached to each node. These algorithms may also create new relationships which are not pre-declared in the base data grid/graph.

Having both a relational model (data grid) and graph model provides flexibility in building analytic solutions. The optimal data representation (grid or graph) may be used for each type of analytic model/service. For example, a time series analysis may be implemented efficiently using the data grid. Centrality, path, connectivity and community analysis as well as the creation of undeclared relationships is performed more efficiently using a graph model. The graph model may also be enriched using the knowledge graph concept, data sets and callable services from Google as well as other RDF sources.

Moreover, libraries of pre-built analytic solutions and services are available using both types of models. Therefore, the combination of data grid and graph model may be used to achieve the desired benefits.

B3) Analytics

Analytic capabilities may be categorized by domain scope:
- domain-specific: where the data/analytic models are self-contained within a given domain
- multi-domain: where the data/analytic models transcend multiple domains.

Moreover, there may be two broad categories of analytic capabilities: models and services:

Analytic models
1) Arithmetic/statistical: these models specify arithmetic/statistical calculations using data in the grid or graph. Calculation results may be pre-computed and stored or available as a callable service. This derived data is then available for use by other analytic components (models 1-4, services 1-4).
2) Computational: these are more sophisticated models such as market risk (e.g. value at risk), credit risk, liquidity risk and stress-testing models in a bank. The resulting derived data is then available for use by other analytic components (models 1-4, services 1-4).
3) Rule-based: these models specify rules and actions (e.g. if—then—else). These rules may be "event driven" where changes in the grid/graph cause rules to "trigger" and take actions. Examples of actions include alerts as well as the creation of additional information (e.g. facts, relationships) that may be used by other analytic components (models 1-4, services 1-4).
4) Machine learning: these models use the data grid/graph to derive insights and take action. Examples of actions include alerts as well as the creation of additional information (e.g. facts, relationships) that may be used by other analytic components (models 1-4, services 1-4). The development of machine learning solutions is accelerated by using the RM configurator and analytic toolkit which are provided in the basic skills module.

Analytic services
1) Data services (contextual): The data grid/graph contains vast amounts of data and knowledge which is made available with contextual data services. Contextual means that a broad set of facts related to the specific requested data are considered and included (based on relevance) in the answer to the query.
2) Prediction services (contextual): The data grid/graph enable contextual predictions as services. For example, how likely is a customer to be interested in a specific product offer? Contextual means that a broad set of related facts are considered in making the prediction.
3) Search and visualization: The ability to search the data grid/graph and visualize the results and rationale.
4) Graph visualization: The ability to visualize and navigate the graph model.

Monitoring and Diagnostics Skills

Once MAP analytics are configured the data grid/graph data may be continuously updated to reflect the latest information/state. Data feeds include internal systems such as book of record transaction systems, collaboration applications (e.g. mail, text, social), derived data systems (e.g. risk, AML) as well as external data sources (paid services—e.g. financial data, government, etc.).

As the data grid/graph is updated, the analytic modules may continuously monitor state changes to detect issues that should be presented to the user. The detection of issues can be achieved using all analytic models and services. Once an issue is detected, it can be presented as an alert to the user in the alert pane or directly in tables, charts or diagrams within a Domain.

The monitoring and diagnostic skills alert users to conditions requiring their attention. Using the MAP method, monitoring and diagnostic skills evolve gradually to provide more sophisticated analysis.

MAP: Basic Skills

FIG. 9 describes the architecture of basic skills, in one embodiment. These skills are designed to accelerate the prototyping, development, refinement and overall lifecycle management of a MAP RM.

A1.1) Interaction

As depicted in FIG. 10, interaction skills may include the ability to understand user commands 1001 (voice, text, sound, visual, widgets) and respond accurately to these commands. In addition, interaction skills may include the RM's ability to communicate with the user via: voice, text, sound, alerts and widgets.

The RM may visually recognize the user for login. The user can then interact with the RM using voice, text, widgets and visual commands 1001. FIG. 10 illustrates how the RM translates commands to specific views. The user may issue commands by voice, sound (e.g. clapping), unstructured text, or by interacting with user interface widgets (e.g. table, geo-map, line, bar, waterfall, etc.). Widgets may include visual cues for the user (e.g. color, blinking, icons, etc.).

The interaction module enables the user to obtain precise information very quickly. This is the result of the data model, search methods and technical implementation which together deliver a precise response with minimal time delay. For example, with a voice command, the user may request to view the income statement for a specific organization unit, in a specific currency for a specific time frame, in a specific geography. The MAP interaction module will parse this voice command into keywords and determine which view to display with specific metric, pivot, filter and time settings. The relevant facts are then obtained from the data grid/graph and displayed using a visualization widget.

Figure 11:
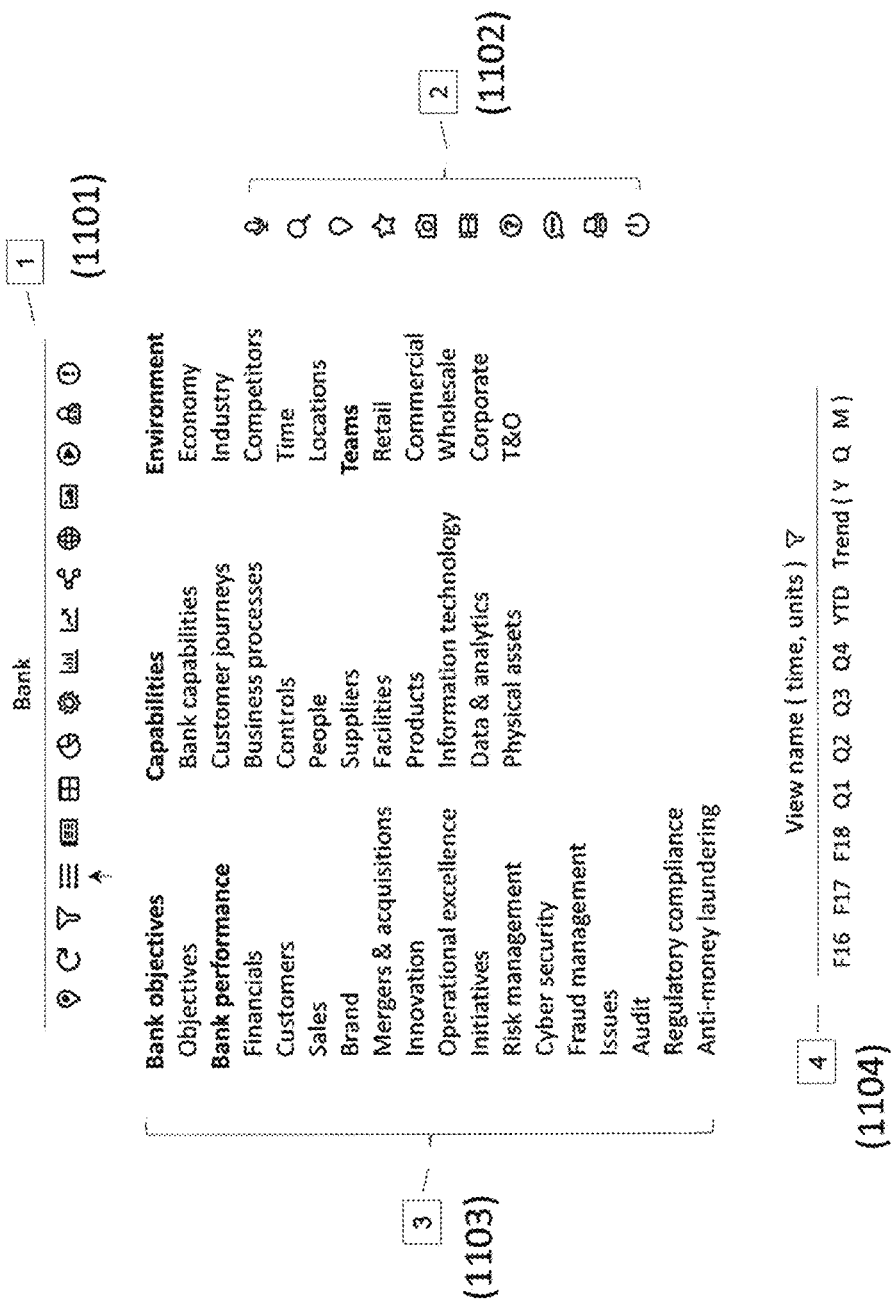
FIG. 11 shows a wireframe overview of the MAP user interface, in one example.
Figure 13:
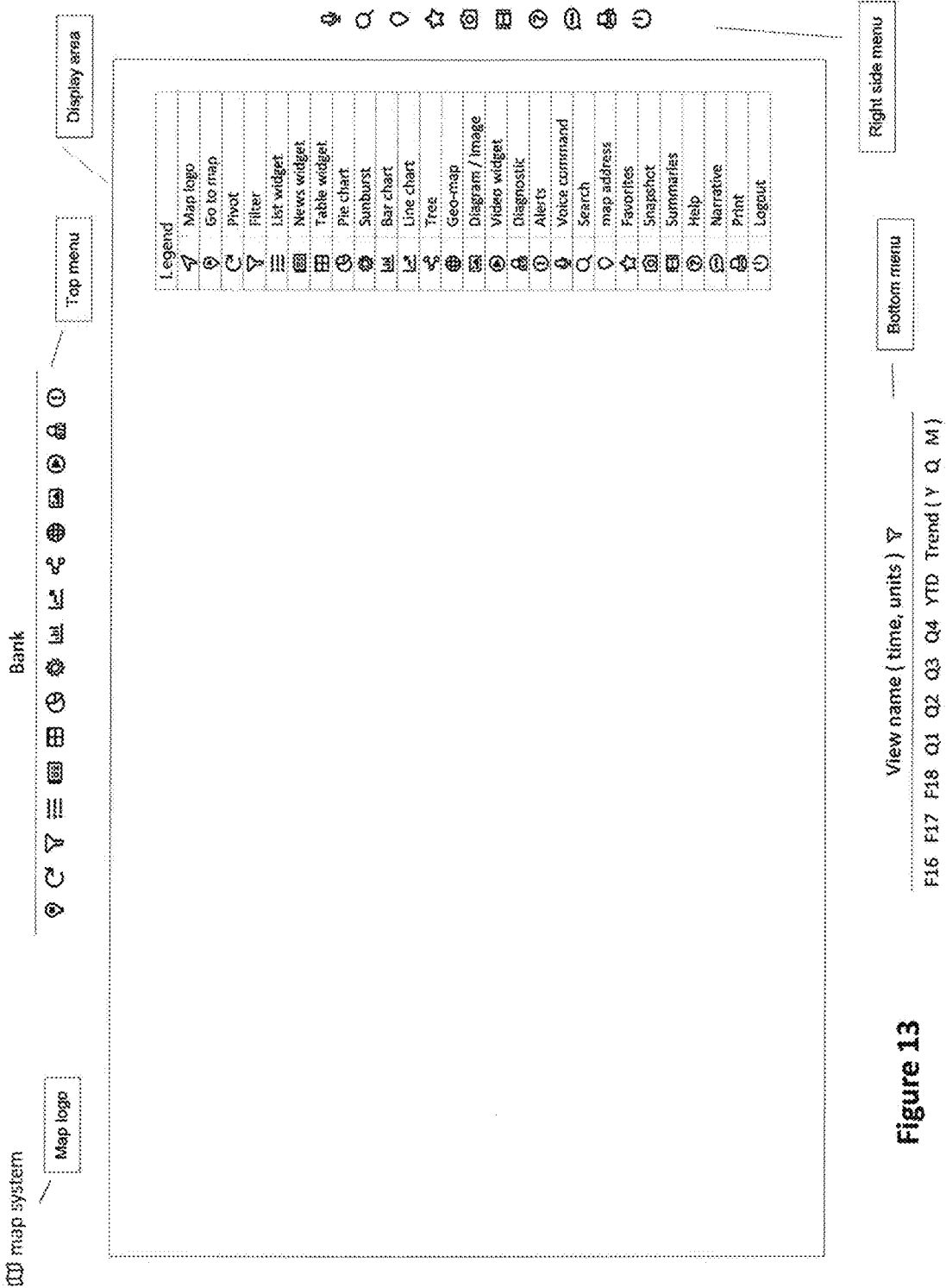
FIG. 13 depicts the components, architecture and icons of the user interface.

FIGS. 11 and 13 illustrate the MAP RM wireframe which includes 4 sections: (1) top menu (1101), (2) right side menu (1102), (3) view area (1103), and (4) bottom menu (1104).

1) Top menu: may comprise a first row which is a "bread crumb". The information reflects the path that has been traversed by user when navigating the menu system. For example, "Bank" indicates that the current view is the root menu. If the user clicks on "Financials", the bread crumb will display: "Bank CI Financials". The user may click on any node in the bread crumb to access directly this location in the path. The result is a highly efficient method to navigate the menu tree structure both forward (using the widget in the view area) and back (using the bread crumb). The second line in the top bar may comprise the following icons/ menu items, shown in Table 11:

TABLE 11

MAP user interface - top menu

Display the navigation menu at this location in the data grid/ graph. This enables the user to access the menu of navigation options at this location in the data grid/graph. For example, if a data visualization widget is currently displaying information, the user simply clicks on CI to display the navigation menu
Display the pivot menu at this location. When data is associated with a node in the data grid/graph, clicking on CI displays the valid pivot options based on the visualization widget which has been selected (e.g. table, sunburst, bar, pie, etc.)
Display the filter menu at this location. When data is associated with a node in the data grid/graph, clicking on CI displays the valid filter options for this data set.
List widget: This visualization widget is shown in FIG. 14. It displays information in columns with indentation at each level in the tree.
Table widget: This visualization widget is shown in FIG. 17. It includes expand/drill-down features as well as bar chart visualization within the table.
News widget: This visualization widget is shown in FIG. 18. It displays information in columns with indentation at each level in the tree. It also enables data filtering based on the desired precision level using Pareto analysis.
Geo-map widget: This visualization widget is shown in FIG. 19. This version is based on Google maps. Other geo-mapping plug-ins may be used (e.g. Bing).
Sunburst widget: This visualization widget is shown in FIG. 23
Other visualization widgets such as: pie, bar, histogram, waterfall, etc. are automatically displayed on this line if they are valid visualization options. This gives the user the ability to change the view in the display area with one click to quickly understand the data set.

2) Right side menu: This menu provides features to search the grid/graph, go to a specific location in the grid/ graph (favorite, specific address), capture displayed information (take a picture or download), display additional information (help, narrative), and control the overall RM (settings, logout). See Table 12, below:

TABLE 12

MAP user interface - right side menu

Voice command: Click and issue a voice command. Voice commands may also be issued by saying a specified keyword (e.g. MAP).
Unstructured search: search the data grid/graph
Favorites: set or go to favorite view
Data grid/graph address: capture or go to a specific address in the data grid/graph
Take a picture: take a picture of the current view. This picture is captured in a summary "clip" which is accessible in "Summaries"
Summaries: a summary is a sequence of views which have been captured using the picture CI feature. A clip may be created, given a specific name, edited and downloaded to specific file formats (e.g. PDF, power point, Excel). This enables users to navigate the data grid/graph, capture information, organize it, view it, save it specific file formats for presentations or other uses.
Download to Excel: Data in the current view is downloaded to Excel
Help: Dynamic help displays pop-up information based on the position of the cursor or questions (voice, text) from TABLE 12-continued MAP user interface - right side menu the user.
Narrative: Display narrative information relating to the current view (e.g. explain financial results)
Print: Print view or Summary
Logout: user logs out 3) View area: Information may be displayed in the view area using widgets. Widgets selection and design are optimized to make the view as simple as possible to enable the user to quickly understand the facts. Moreover, the top bar gives the user options to select different widgets to view the same information in different formats (table, charts, geo-map, etc.). Widgets in the view area are dynamic which means that the user is able to interact with the widget to display additional information, less information, drill-down, filter, pivot, request diagnostic, request prediction, request associated facts (e.g. unstructured information in the graph).

4) Bottom menu: This bar may be divided into two rows: the first row specifies the location in the data grid/graph as a reference point for the user; the second line provides a time setting menu to enable the user to quickly view the data with different settings in the time dimension. The time dimension is one of the most frequently used and its position in the wireframe improves the user experience. The address bar may have the following format: View name (time, units)

See FIGS. 14, 15, 16 and 17 for example MAP user interfaces.

A1.2) Visualization

Visualization skills may include the ability to determine valid options to display information along with multiple widgets to display. The base set of visualization widgets may include the following: table, geo-map, line, bar, waterfall, histogram, pie, doughnut, sunburst, bi-partite.

Each of these widgets may be refined to provide more advanced visualization features. Additional widgets may easily be added to this module. The MAP Platform may include a dimensional model that enables automated selection of applicable widgets based on the data set to be displayed. The user is therefore presented with a set of valid options to displayed the requested data. A default visualization widget is specified and may be updated by the user via a simple command.

A list of exemplary MAP interaction and visual widgets are shown below in Table 13, and selected ones are depicted in FIGS. 17-28.

TABLE 13 visualization widget examples
MAP interaction and visualization widgets - examples

| Table | Geo-map | Line |
|---|---|---|
| Bar | Waterfall | Histogram |
| Doughnut | Sunburst | Bipartie |
| Structure | Tree | Search |
| Help | Narrative | Relationships |
| Matrix | Diagram | Summary |

Summaries Widget

The Summaries Widget enables the user, in one embodiment, to take pictures of Views and combine them into a "Summary". Summaries are therefore sequences of Frames that can be created, stored and then replayed. This allows the Region Teams (or user community) to publish the results of their analysis for specific issues.

Summaries can be replayed using multiple time frames: (1) the original time frame when the analysis was conducted, (2) the current time, (3) any other time frame specified by the user. This feature enables re-use of "evergreen" analysis as well as exploration of different scenarios.

See examples in FIGS. 25, 26, 27 and 28.

A1.3) Language

The user may specify language preference. Language skills (user interface, listening, speaking, reading) may be added as needed.

A1.4) Teaching

Teaching skills include the ability for the user to quickly find learning topics as well as RM skills to teach users using multi-media (voice, text, video, documents, animations, spreadsheets, etc.)

A2.1) Adapters: Collaboration/Productivity Applications

Re-usable adapters (205 in FIG. 2) may be used to integrate the RM with collaboration and productivity tools (206 in FIG. 2) such as email, text messaging, social networks, office productivity suites (e.g. Microsoft Excel, Word, Power point). This enhances the RM's ability to communicate with users and enables users to transfer RM data and analytic results to office productivity tools (e.g. Excel).

A2.2) Adapters: Enterprise Applications

Re-usable adapters (205 in FIG. 2) may be used to integrate the RM with key enterprise applications (206 in FIG. 2) as illustrated below. This accelerates the implementation of RMs in the enterprise. Examples of such adapters are shown in FIG. 29.

A2.3) Adapters: Data Sources

Re-usable adapters may be used to integrate the RM with external data sources such as public sources (government, universities) and enterprise sources (customers, suppliers, big tech—Google, Facebook, market data—Bloomberg, Reuters, etc.). This accelerates the implementation of RMs in the enterprise.

A3) RM Configurator

The RM configurator enables rapid RM prototyping and development. The configurator may include libraries of pre-populated data grids/graphs along with analytic solutions and libraries. These can be instantiated in the MAP platform and then be adapted and refined using client specific data and analytic models.

A4) Analytic Toolkit

The analytic toolkit may include key building blocks for big data analytics. These may be obtained from open source or suppliers who provide enhancements to these features.

A5.1) Data Management

Data management skills may be used in conjunction with the present invention. For example, these may include the ability to: design, implement, operate and maintain a data model that is used by the RM. This data model typically evolves over time as new and/or enhanced skills are added to the RM. For example, the depth of data granularity may be increased and/or the breadth of domains may be expanded. The MAP Data Management Application of the present invention may be designed to support users in visualizing the Data Model (e.g. structure, attributes, relationships) as well as monitoring data completeness & quality. It may be used by the MAP Domain teams to create, govern and maintain the MAP Model. Features may include:

Data Governance and Visualization: View and analyze the data grid/graph including: Fact Tables, Dimension Tables, Fact Ledgers, Fact Journals, Relationships Data Validation and Maintenance: Validate the data completeness and quality of the MAP Model with automated analysis and visualize issues that need to be addressed by the Domain Teams. Update the Data Model for completeness and accuracy.

A5.2) Analytics Management

Analytic management skills may be used to enable the evolution of the RM's analytic capabilities. Analytic management skills include the ability to: configure, test, run, and refine multiple types of models: arithmetic, statistical, computational, rule-based, robotic process automation, and machine learning.

A5.3) User Management

User management services may provide the ability to create a MAP user account, update access privileges, view account activity, send messages to users and revoke access rights. This may be used to ensure information security and data privacy. Sample features:

Create account types with specific access privileges and authentication criteria Create an account, update access privileges, delete account Monitor account activity including domain and specific table access Grant/deny access to specific domains or tables A5.4) Platform Configuration Management Multiple configuration files may be available to specify MAP system features and make it fast and easy to tailor applications look, feel and functionality. Configuration files may also contain rules that specify how MAP services and widgets behave.

A5.5) Platform Metrics, Monitoring & Diagnostics

The RM manager may be used to monitor and analyze RM metrics and statistics with an integrated view on: users, usage, data grid/graph capabilities/usage, analytics capabilities/usage, graph capabilities/usage, domain capabilities/usage, etc.

MAP: Prototyping, Implementation, Refinement and Scaling Method

FIG. 30 describes the MAP method which may be used to prototype, build, refine, and maintain robotic managers, according to the teachings of the present invention, in one embodiment. This method is described in further detail below.

Step 3001. Set Up Project

This phase includes two steps: 1) prioritize & select domains and 2) assign domain & integration teams.

With respect to FIG. 31, a MAP project may be staffed with one or more domain teams along with an integration team.

a) Domain teams: Each of these teams is responsible to identify, source and maintain the data for their respective domain. In addition, this team works closely with RM users to refine domain views, analytics and alerts. Team members are typically subject matter experts in their respective field (e.g. finance, risk, HR, technology, business process, marketing, etc.). Domain teams can be created and launched in a phased approach based on priorities.

b) Integration team: The integration team is responsible for the overall RM solution. This team is trained on the MAP method/tools and manages project execution across domains.

Step 3002. Prototype Basic Skills

Figure 32:
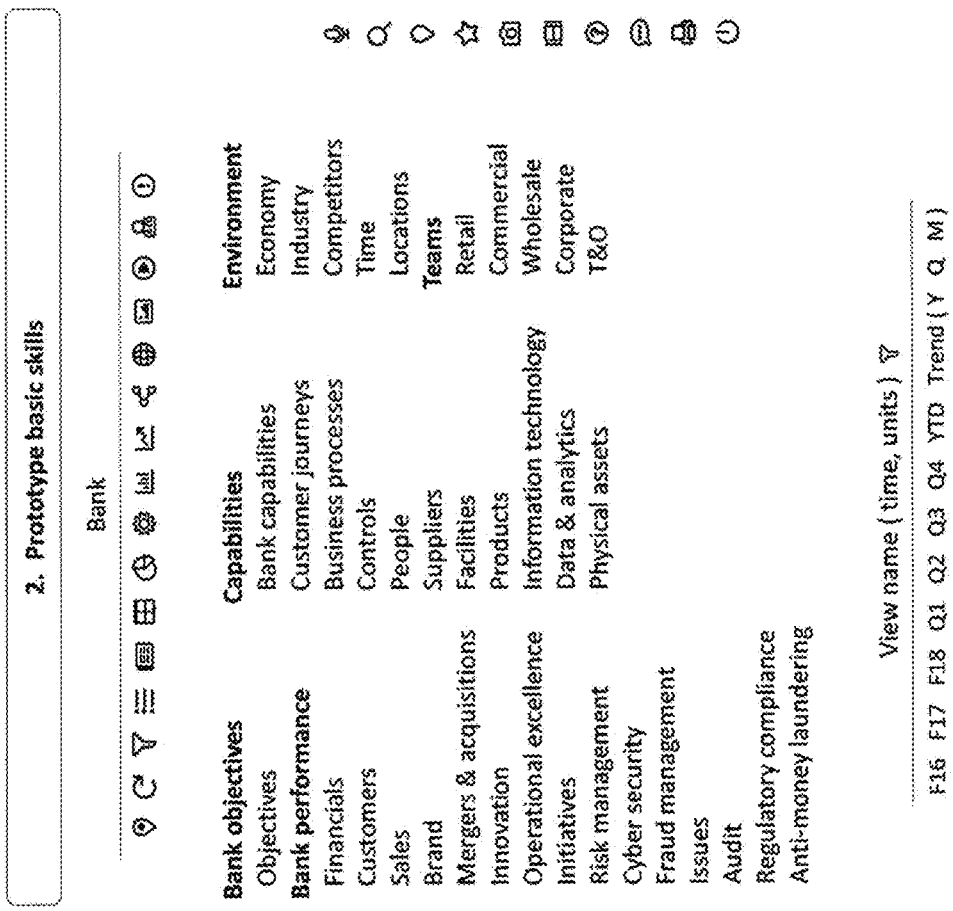
FIG. 32 depicts prototyping basic skills.

With respect to FIG. 32, a prototype of basic skills may be assembled quickly using the configurator. The user simply loads the basic skills and then is able to configure parameters such as: fonts, color palette, language, visualization widgets, application and data interfaces, users, etc.

Step 3003. Prototype Expert Skills

Figure 33:
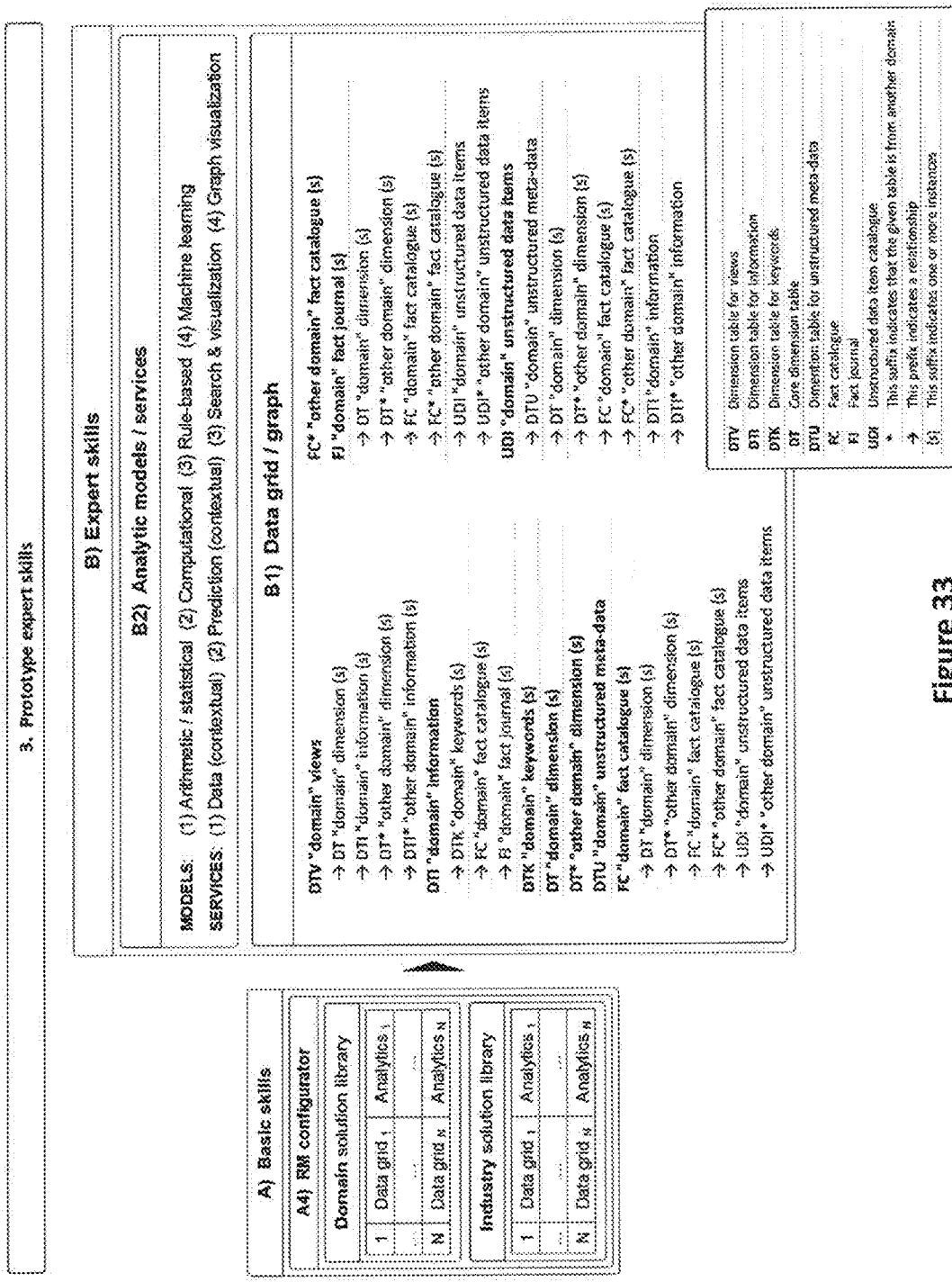
FIG. 33 depicts prototyping expert skills.

With respect to FIG. 33, a prototype of expert skills may be assembled quickly using the RM configurator. The user simply selects a domain or an industry and uploads the data and analytic models in the data grid/graph.

FIG. 34 depicts the map data grid/graph configuration and iterative refinement method. The following six steps are used:

1. Load domain or industry using configurator (3401): The RM management team selects a domain or industry configuration to add to the RM. The configurator uploads corresponding data and software modules: data grid/graph, configuration files, analytic models and services.
2. Adapt domain ontologies (3402, 3403): The baseline RM loaded by the configurator may be adapted to meet specific needs. The adaptation process may include the following steps:
   a. Adapt keyword (DTK) table (s): Keyword tables/items may be added/deleted or modified.
   b. Adapt information (DTI) tables (s): Information tables/items may be added/deleted or modified.
   c. Adapt core dimension (DT) table (s): Core dimension tables/items may be added/deleted or modified.
   d. Adapt meta-data for unstructured data (DTU) table (s): Meta-data for unstructured data (DTU) tables/items may be added/deleted or modified.
   e. Adapt dimension table (s) for views (DTV): View dimension tables/items may be added/deleted or modified.
3. Generate FC and FJ specifications (3403): Fact Catalogues (FCs) and Fact Journals (FJs) attributes may be specified based on the requirements established in step 1-2.
4. Configure adapters (3405): Adapters may be configured based on the requirements established in 1-3.
5. Populate FCs and FJs (recurring) (3404, 3405, 3406, 3407): Fact Catalogues (FCs) and Fact Ledgers are populated on a recurring basis and the data grid/graph is updated accordingly.
6. Populate UDIs (recurring) (3404, 3405, 3406, 3407): Unstructured data items are populated on a recurring basis and the data grid/graph is updated accordingly. Automation may be used to "crawl"/parse structured, unstructured, and streaming data sources, both internal and external to A domain may comprise dimension tables describing the structure of key concepts and fact tables containing data for the given domain. Dimension tables may describe the structure of concepts in the data grid/graph. In one embodiment, all dimension tables (DTV, DTI, DTK, DT, DTU) are structured following the same pattern which describes a multi-level hierarchy Ll-LN.

Examples of core dimension tables (DT) include:

DT spend categories: categories of supplier spend

DT IT asset types: types of IT assets such as applications and infrastructure components DT facility types: types of facilities such as branches, office space, data centers, call centers DT process types: types of business processes such as product processes (onboarding, fulfillment, servicing) and enabling processes (finance, risk, compliance)

DT risk types: types of risks such as market risk, credit risk, operational risk DT regulation types: types of regulations such as capital, non-capital, liquidity and funding DT physical asset types: types of physical assets such as vehicles, aircrafts, equipment Core dimension tables (DTs) may be divided into 2 categories:

Unifying dimension tables: These tables are used by multiple domains in the data grid/graph and unify dimensions of the model across domains. Examples include:

DT period: time periods, for example: fiscal years, quarters, months

DT organization units: organization units, such as operating groups, corporate functions and lines of business DT locations: locations such as countries, states, provinces, cities Domain specific dimension tables: In one embodiment, these tables are used only within a specific domain. Domain-specific tables comprise any table being referred to only by other tables within the same domain.

Fact tables may be sub-divided into two categories:

Fact catalogues (FC): Contain a list of items describing a specific concept. Examples include: IT assets, real-estate assets, suppliers, customers, employees, contractors, physical assets, processes, data domains, risks, regulations, etc. Fact catalogues typically point to dimension tables to provide a hierarchical classification of the concept.

Fact journals (FJ): Contain time stamped entries representing change in state for items in a fact catalogue or dimension table. Examples include: financials, key performance indicator and metric status: processes, technology, facilities, risk, suppliers, regulatory, cyber security, fraud.

Records in fact tables may point to records in dimension tables to describe the structure of concepts. For example, the logical disaggregation of: IT assets, real-estate assets, business processes, etc.

Records in fact tables may point to records in other fact tables to describe the relationships between concepts. For example, fact journals may point to fact catalogues to describe: spend by supplier, spend by initiative, benefits by initiative, etc.

Each domain may be assembled with fact and dimension tables which describe the structure of concepts (L1-Ln) and relationships between concepts. Relationships can be specified between items within a domain or between items in different domains (e.g. Products 4↔Processes↔Technology).

Fact tables may be loaded in the MAP data grid/graph at time intervals specified by each Domain team based on the requirements of specific applications. A data validation script is included in the data loader to ensure data completeness and quality.

Data may be ingested from multiple sources, such as shown below in FIG. 42:

The MAP data loaders may be designed to ingest multiple sources of data into the data grid/graph. Sample features include:

Adaptors: Support multiple file formats such as Excel, SQL, and application adapters/data adapters for: core banking systems, CRM, SRM, ERP, RDF file format, market data service provides, etc.

Data validation: Validate the completeness and quality of the data being loaded into the data Model Data loading control: Specify and control the scope of the data set to be loaded into the data Model Step 3004. Expand and Refine RM Skills Expert skills are refined for each domain through a series of iterations. See FIG. 35.

Examples of capabilities for each domain are outlined below:

Objectives: Specify enterprise and team goals and objectives across knowledge domains. Monitor progress against objectives and diagnose gaps.

Financials: Monitor financial performance and diagnose gaps: income statement, balance sheet, capital, growth rates.

Operational excellence: Monitor banking operations and diagnose gaps: Customer-facing business processes (onboarding, fulfillment, servicing) for all products: deposit, lending, cards, retail wealth, asset management, treasury & payments, investment & corporate banking, trading, Enabling business processes: finance, risk, AML, regulatory, HR, marketing, technology.

Initiatives: Monitor initiatives and diagnose gaps: technology (channels, data & analytics, core banking systems, mandatory/regulatory, etc.), spend efficiency, branch network evolution, organization restructuring, marketing campaigns and brand building initiatives, etc.

Customers: Monitor performance against specific customer segments and diagnose gaps: net acquisition (gross acquisition less attrition), customer loyalty (e.g. Net Promoter Score)

Sales: Monitor sales performance and diagnose gaps: by operating group, by line of business, by product, by branch, by location, by individual.

Brand: Monitor brand measures and diagnose gaps.

M&A: Monitor mergers & acquisition activities and diagnose gaps: pipeline, due diligence, integration.

Innovation: Monitor innovation in strategic areas: digital channels, data & analytics, business model, payments, Block chain, etc.

Risk: Monitor risk and diagnose gaps: risk appetite & limits, risk performance (e.g. market risk, credit risk, operational risk, liquidity risk).

Regulatory: Monitor regulatory compliance and gaps: adherence to regulations—by regulator, by regulation, by operating group, line of business and function.

Cyber: Monitor cyber threats as well as defense capabilities and diagnose gaps: threat level, defense capabilities based on industry frameworks (NIST, ISO), improvement initiatives.

AML: Monitor adherence to anti-money laundering and terrorist financing regulations and diagnose gaps: customer risk scoring, transaction monitoring, know your customer, etc.

Fraud: Monitor fraud activity and diagnose gaps: card, non-card.

Issues: Monitor audit and regulatory issues along with remediation plans.

Audit: Monitor audit plans, ongoing audits and audit reports; diagnose gaps.

Organization: Monitor changes in organization and diagnose gaps: employees, contractors, global resources; headcount, cost, mix, efficiency, ancillary costs (IT, travel)

Customer Journeys: Monitor the creation and performance of customer journey capabilities; diagnose gaps: customer journey definition, key performance indicators, linkages to products, channels, processes, data & analytics, & IT.

Products: Monitor the catalogue and performance of products; diagnose gaps: non-performing products.

Channels: Monitors channel performance and diagnoses gaps: digital, branch, ATM, call center, sales force, POS, kiosks.

Processes: Monitor and diagnose the performance of business processes; diagnose gaps: customer facing processes (onboarding, fulfillment, servicing) for all products; enabling processes (finance, risk, regulatory, HR, technology, etc.)

Data & Analytics: Monitor the evolution and performance of data & analytics capabilities across the bank; diagnose gaps: data quality, data lineage, data owners, analytic applications (data, computational, cognitive)

Technology: Monitor the performance of technology and diagnose gaps: availability, response time: channel applications, core banking applications, critical infrastructure.

Real-Estate: Monitor the evolution and performance of real-estate assets; diagnose gaps: branch network, office space, critical facilities (call centers, data centers, trading rooms, operations centers).

Suppliers: Monitor the performance of suppliers and the sourcing function; diagnose gaps: spend levels, spend productivity, supplier risk management.

Physical Asset: Monitors the performance of physical assets; diagnose gaps. Examples: vehicles, aircraft, etc.

Economy: Monitor changes in key economic indicators such as GDP, interest rates, unemployment, housing, consumer spending, business investment, commodity Industry: Monitor market size and growth rates by segment Competitors: Monitor financial performance and evolution of strategic capabilities of existing and emerging competitors.

Time: Monitors changes across all domains thru time; diagnoses cross-domain issues; enables time-based model navigation.

Locations: Monitor performance by location and diagnose gaps.

Technical Implementation

In order to simplify implementation and deliver a high quality, flexible software platform, the following technical choices may be used, in one embodiment, for the MAP platform architecture:

TABLE 15

| | Components of the MAP technical implementation approach |
|---|---|
| 1 | Implementation with micro-services |
| 2 | Use of configuration files for flexibility |
| 3 | Use of a relational database to persist data |
| 4 | Use of in-memory graph structures |
| 5 | Use of a real-time graph database |
| 6 | Use of SPARK in-memory processing |
| 7 | Use of a data science platform along with machine learning library |
| 8 | Support of RDF data sets |

Applications to Banking, Other Industries and Problem Domains

Complexity in Understanding and Managing Banks

Banks are highly complex enterprises which are difficult to fully understand. The most senior leaders overseeing banks, including top management, board members and regulators, each have a perspective on a broad set of issues; however, it is virtually impossible for anyone to simultaneously achieve breadth and depth of knowledge for a given bank given the number of facts that need to be understood.

The complexity confronting senior banking executives is a result of the large number of domains that must be mastered to effectively manage a bank. Each domain in itself is complex and the overall complexity is magnified by the need to understand cause and effect relationships between domains. For example, how risks impact financial performance and how business processes, data/analytics and information technology capabilities impact customer experience.

Examples of domains, relationships across domains and the resulting complexity are outlined below:

Financials—income statement, balance sheet, capital.

Risk—market risk, credit risk, operational risk, stress testing; capital calculations and ratios: regulatory capital, economic capital, rating agency capital; liquidity ratios.

Regulatory—capital regulations, non-capital regulations, liquidity & funding regulations.

Customers—customer segments, customer experience, loyalty, acquisition, attrition, and share of wallet.

Sales—sales force effectiveness, sales trends across lines of businesses, channels, products, and geographies.

Brands—brand measures and return on marketing investments.

Mergers & Acquisitions—acquisition pipeline, due diligence and execution on integration projects.

Innovation—innovation in areas that will create competitive advantage: digital experience, data & analytics, process digitization, branch format & technology, payment technology, new business models.

Economy—changes in key economic indicators: GDP, interest rates, consumers, business, inflation, unemployment and implications to banks.

Competitors—Relative financial performance, strategic capabilities.

Cyber and Information Security—Evolving threat level, effectiveness of defense capabilities.

Anti-Money Laundering and Terrorist Financing—Sanctions, customer risk scoring, Know Your Customer (KYC), transaction monitoring, defense capabilities.

Fraud—credit card fraud, linkage to cyber security, other types of fraud, trend levels, defense capabilities.

Operations—Business process performance (e.g. cycle-time, defect rates and transaction unit costs for core processes—e.g. onboarding, fulfillment, servicing for banking products and services (e.g. deposit, lending, cards, payments, retail wealth, etc.). Performance of core technology applications (availability, changes).

Initiatives—catalogue and executions status of transformation initiatives underway including: mandatory initiatives (to meet regulatory requirements) and discretionary initiatives (to improve the capabilities of the bank). Discretionary initiatives may include: digital channels, data & analytics, business process improvement, core banking system replacement, evolving the physical distribution network (branches, ATMs) as well as office space and critical facilities.

Organization—organization structure, leadership, workforce, cost structure, efficiency, layers, succession planning, engagement, diversity. Ability to optimize organization structure, staffing and skills along with the use of partners (outsourcing, global resources, contractors).

Products—product categories, revenue by product, capital allocation by product type, product complexity and rationalization requirements, risk by product type.

Business Processes—business process catalogue, FTE and cost allocation by business process, business process metrics (cost, time, quality, risk), initiatives by business process, business process leaders.

Data & Analytics—data domains, data leaders, data & analytics capabilities and initiatives and linkages to business performance: risk, regulatory, customers, growth Information Technology—enterprise IT architecture, IT strategy and explicit linkages to business strategy and performance: risk management, regulatory compliance, customer experience, growth, competitive capabilities (payments, digital banking, block chain).

Real-Estate—catalogue or real-estate assets: branches, ATMs, office space, critical facilities; workforce distribution by location, and real-estate asset specific performance indicators: sales, costs, FTEs, quality, risk; evolution of the physical distribution network (branches, ATMs) as well as office space and critical facilities.

Suppliers—catalogue and classification of suppliers by risk level; supplier spend by category, by line of business/function, by supplier; supplier risk assessment and actions to reduce supplier risks.

Accelerating Pace of Change

Banks are now operating in an environment of accelerated change driven by exponential improvements in information technology (e.g. mobile, analytics, social, cloud), a new generation of customers with expectations set by technology industry leaders (e.g. Google, Facebook, Amazon) as well as new competitors entering the industry (e.g. Apple Pay, Fin Tech). This "new normal" implies that banks need to evolve quickly to protect their competitive position.

The pace of change in banking is accelerating quickly. Factors driving acceleration include:

Evolving customer preferences—existing customers and a new generation of customers (Millennials) have heightened expectations for customer experience especially as it relates to digital self-service channels. Customer expectations are shaped by their experience with technology industry leaders such as Google, Facebook, Apple and Amazon. Customers expect their bank to deliver an experience that is equivalent in quality and responsiveness. Banks that are unable to close this gap will be at an increasing strategic disadvantage over time.

Advances in information technology—Information technology continues to progress at an exponential rate (Moore's Law) and as a result if fueling transformational innovation that is and will continue to having a profound impact on the banking system:

Digital devices and mobility: mobile phones, tablets and related capabilities

Social networks: e.g. Facebook, Twitter, LinkedIn

Data & Analytics: robotics and machine learning

Block chain and crypto-currencies

Cloud computing: public and private clouds

The emergence of new competitors—new competitors are entering the banking industry to provide strategic capabilities or compete directly with banks:

Technology industry leaders: e.g. Apple Pay, Google Pay

Fin Tech players: tens of billions of dollars invested in Fin Tech over the last 3 years. These new entrants are focused on: mobile payments, block chain, peer-to-peer payments, digital financial advisors, and new business models.

Rapidly evolving Cyber security threat landscape—cyber security is now viewed as a top-line risk for banks. The accelerating threat level requires banks to implement a comprehensive set of defense capabilities to protect customer, the institution and its shareholders.

This environment is driving banks to quickly introduce new capabilities and modernize their underlying process, data and technology platform (e.g. digital channels/payments) to remain competitive and relevant to customers.

The Importance of Integration: Across Lines of Business (Products), Functions, Channels, Geography The strategic objectives of banks are increasingly dependent their ability to achieve cross-functional, cross-lines of business (LOB) and cross-geography alignment and team collaboration. For example, creating customer-centric and/or enterprise-wide capabilities, or aggregating/analyzing data enterprise-wide to meet regulatory requirements requires a cross LOB and functional collaboration.

Increasing Gaps in Skill Sets Required to Effectively Manage Banks and the Banking System The rapid shift to digital banking, new payment methodologies, accelerating cyber security threats, adoption of advanced analytics including AI and machine learning combined with enterprise wide transformation initiatives have resulted in skill gaps at multiple levels in the management of the financial system and banks.

Implications on Risks to the Financial System and Individual Banks

The combination of complexity, accelerating change, and gaps in technical skills result in greater risks to the financial system and individual banks.

The MAP System and Method—Design Objectives

The MAP System is designed to augment the problem solving abilities of enterprise leaders by increasing depth, breadth and integration of their knowledge relating to the enterprise and its operating environment.

The goal is to help leaders and teams optimize decisions based on integrated, timely, shared knowledge and analysis.

TABLE 16

Business value of a MAP RM
MAP robotic manager - business value

| | |
|---|---|
| Learning Organization | Provides a common mental model for leaders and teams across the bank including structure, definitions, decomposition and relationships for each Domain. This common model along with its integrated fact base facilitate dialogue, collaboration and problem solving |
| Speed and Simplicity | Reduce time lag to insights and resulting management actions Ability for senior leader to answer their own questions quickly thereby keeping teams on their toes and creating a culture of transparency |
| Precision Execution | Ability to set specific objectives and monitor progress in achieving these objectives. Disaggregate big concepts into bite size chunks for detailed analysis where needed. |

Figure 35:
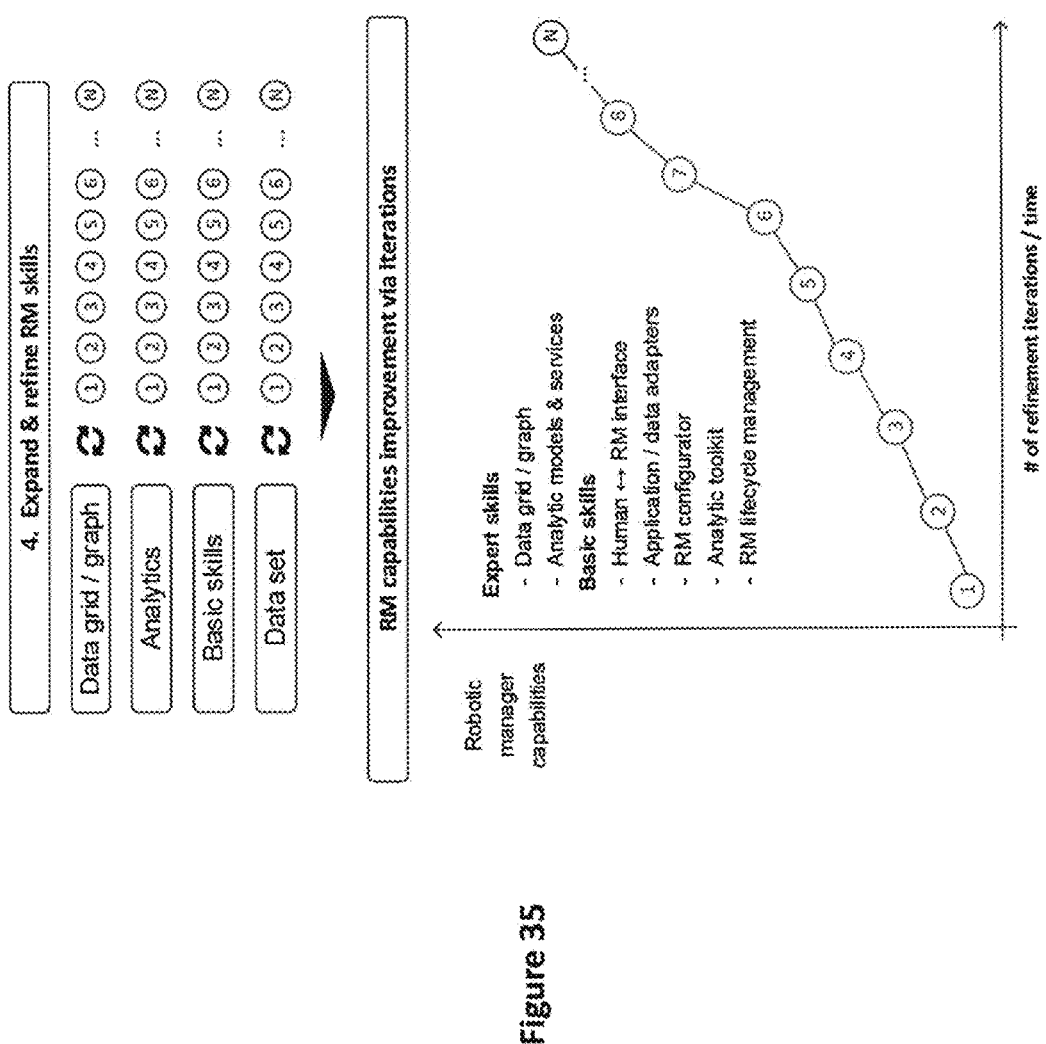
FIG. 35 depicts improving RM skills through an iterative method.
Figure 36:
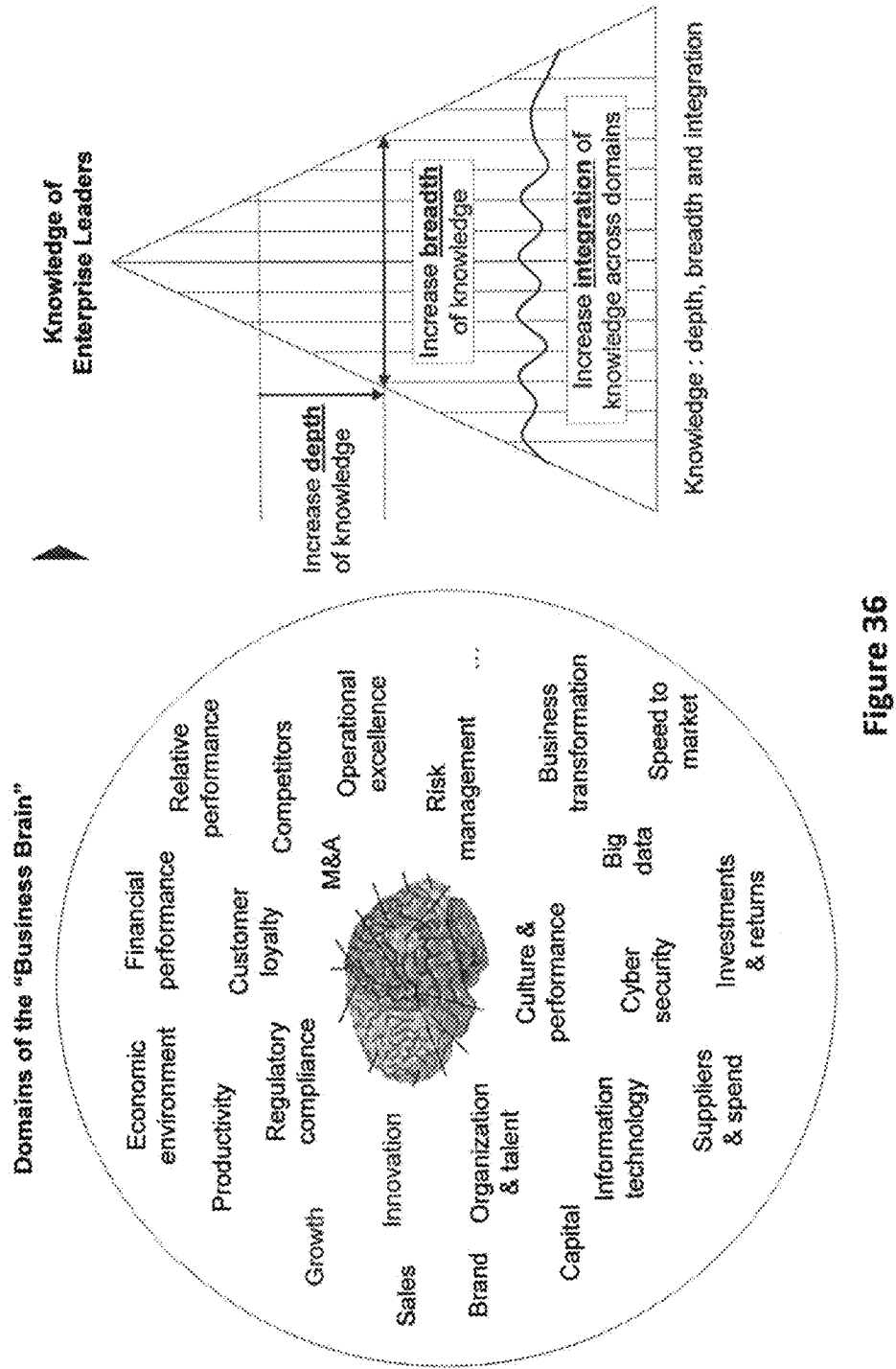
FIG. 36 depicts augmenting breadth, depth and integration of knowledge across multiple domains.

The MAP RM is the enterprise leaders' assistant. It is designed to augment enterprise leaders' breadth, depth and integration of knowledge across multiple domains, as shown in FIG. 35.

In one instantiation, the MAP RM assists users quickly understand:

The environment in which the bank operates. For example: economy, market opportunity, competitors, regulators, threat actors, . . .

The bank's performance: financial, operational, initiatives, risk management, regulatory compliance, customer loyalty, brand equity, . . .

The bank's capabilities: organization, business processes, data & analytics, technology, facilities, physical assets, . . .

The bank's safeguards: risk management, regulatory compliance, audit, cyber security, fraud management, . . .

Alert leaders to issues requiring attention

Quickly navigate thru complex information and data sets to answer specific questions Provide a common language to lead the enterprise's "Run", "Change" and "Safeguard" objectives Enable team problem solving and collaboration The MAP System Is Engineered to Meet the Following Design Objectives:

Fast response time to keep the user highly engaged in the experience

Provide a common language to:
  Describe the bank, its components, performance and capabilities
  Describe the environment in which the bank is operating
  Monitor changes in the bank's components, performance, capabilities and in the environment in which the bank is operating
  Diagnose problems and identify opportunities
  Enable team collaboration and problem solving Provide a navigation interface that:
  Guides the user through the topics, issues and facts that need to be considered to understand and manage a bank. In other words, the navigation system should suggest questions to be asked by the user.
  Supports unstructured search across the data grid/graph to enable users to quickly find information.
  Provides quick access to help/explanations for new terms or concepts
  Includes narratives to explain figures where needed (e.g. financials, risk)

Provide information in the most effective format to help users quickly understand:
  Structured data: tables, charts, diagrams and other visuals
  Unstructured data: documents, animations, videos and sound
  Seamless navigation should be achieved between structured and unstructured data Automatically generate alerts to issues and facts that should be reviewed by the user. The MAP System includes an inference engine that continuously monitors the latest facts and alerts the user to conditions requiring attention. This feature is critical given the complexity of the problem domain and the number of variables that must be monitored.

Support a gradual & phased implementation with rapid prototyping.

Provide seamless integration with enterprise messaging applications (email, text messaging) to enable users to share insights from the MAP System with others.

The MAP robotic manager concept is a next evolution of capabilities in the area of enterprise business intelligence, data and analytics. In a similar fashion, self-driving cars and aircraft auto-pilot systems evolved to meet needs in their respective problem domain, as illustrated in FIG. 43.

Applications in Other Industries and Problem Domains

The MAP System has been described above for implementation in Banks. However, The MAP Platform (Model, Platform, Applications, Method) is engineered to be easily adapted to other industries and problem domains. For example, MAP may be used to build RMs in the following sample industries:

TABLE 18

Sample industries for MAP RM applications

| Airlines | Railroads | Logistics |
| Technology | Industrial | Electric utilities |
| Consumer goods | Oil & gas | Retail |
| Insurance | Healthcare | Pharmaceuticals |
| Automotive | Media | Aerospace & defense |

The invention claimed is:

1. A system for generation of a robotic manager graphical user interface platform, comprising:
   a computer system;
   a database for storing:
      a first template associated with at least one basic skill of a selected domain table: and a second template associated with at least one expert skill of the selected domain table, wherein the computer system in communication with the database generates a relational computer model comprising a nodal network comprising a set of nodes where each node represents a data attribute within a set of structured data, the relational computer model further comprising a path for each node where the path comprises a unique identifier and a dimension data table associated with each node, the dimension data table comprising formatting data corresponding to a method of display for the data associated with the node;
   wherein, upon receiving an instruction from a user computing device, the computer system performs the steps of:
   retrieving the first template from the database;
   retrieving the second template from the database;
   parsing the instruction to identify a node associated with the instruction:
   crawling unstructured data within the database to identify unstructured data associated with the identified node: and
   displaying the robotic manager graphical user interface platform having the at least one basic skill associated with the first template and the at least one expert skill associated with the second template, the manager graphical user interface platform displaying data associated with the identified node where the display is in accordance with formatting data contained with the identified node's path.

2. The system of claim 1, wherein the computer system performs the further set of:
   iteratively enhancing the relational computer model by adding an additional basic skill from a second domain to the at least one basic skill.

3. The system of claim 1, wherein the computer system performs the further set of:
   iteratively enhancing the relational computer model by adding an additional basic skill from a second domain to the at least one expert skill.

4. A method for generating a robotic manager, comprising the steps of:
   storing, by a computer system, in a database a first template associated with at least one basic skill of a selected domain;
   storing, by the computer system, in the database a second template associated with at least one expert skill of the selected domain, wherein the computer system generates a relational computer model comprising a nodal network comprising a set of nodes where each node represents a data attribute within a set of structured data, the relational computer model further comprising a path for each node where the path comprises a unique identifier and a dimension data table associated with each node, the dimension data table comprising formatting data corresponding to a method of display for the data associated with the node;
   upon receiving an instruction from a user computing device, retrieving, by the computer system, the first template from the database;
   retrieving, by the computer system, the second template from the database;
   parsing, by the computer system, the instruction to identify a node associated with the instruction;
   crawling, by the computer system, unstructured data within the database to identify unstructured data associated with the identified node; and
   displaying, by the computer system, the manager graphical user interface platform having the at least one basic skill associated with the first template and the at least one expert skill associated with the second template, the manager graphical user interface platform displaying data associated with the identified node where the display is in accordance with formatting data contained with the identified node's path.

5. The system of claim 4, further comprising the step of:
   iteratively enhancing, by the computer system, the relational computer model by adding an additional basic skill from a second domain to the at least one basic skill.

6. The system of claim 4, further comprising the step of:
   iteratively enhancing, by the computer system, the relational computer model by adding an additional basic skill from a second domain to the at least one expert skill.

7. One or more non-transitory computer readable media comprising computer-executable instructions that, when executed by one or more processors, configure the one or more processors for generating a robotic manager graphical user interface, comprising the steps of:
   storing, by a computer system, in a database a first template associated with at least one basic skill of a selected domain;
   storing, by the computer system, in the database a second template associated with at least one expert skill of the selected domain, wherein the computer system generates a relational computer model comprising a nodal network comprising a set of nodes where each node represents a data attribute within a set of structured data, the relational computer model further comprising a path for each node where the path comprises a unique identifier and a dimension data table associated with each node, the dimension data table comprising formatting data corresponding to a method of display for the data associated with the node;
   upon receiving an instruction from a user computing device, retrieving, by the computer system, the first template from the database;
   retrieving, by the computer system, the second template from the database;
   parsing, by the computer system, the instruction to identify a node associated with the instruction;

crawling, by the computer system, unstructured data within the database to identify unstructured data associated with the identified node; and generating displaying, by the computer system, the robotic manager graphical user interface platform having the at least one basic skill associated with the first template and the at least one expert skill associated with the second template, the manager graphical user interface platform displaying data associated with the identified node where the display is in accordance with formatting data contained with the identified node's path.

\* \* \* \* \*